US008855009B2

(12) United States Patent
Niiyama et al.

(10) Patent No.: US 8,855,009 B2
(45) Date of Patent: Oct. 7, 2014

(54) METHOD AND A DEVICE FOR PROVIDING COMMUNICATION DATA, DATA GATHERING SYSTEM FOR A MOBILE OBJECT, A DEVICE ON THE MOBILE OBJECT FOR THE DATA GATHERING SYSTEM, A NETWORK SYSTEM FOR ORGANIZING VEHICLES, AND A ON-VEHICLE DEVICE FOR THE SYSTEM

(75) Inventors: Hiroyuki Niiyama, Kanagawa (JP); Kenichiro Komatsu, Kanagawa (JP); Kazuki Furusawa, Kanagawa (JP); Akitaka Samejima, Kanagawa (JP)

(73) Assignee: Koito Electric Industries, Ltd., Yokohama-shi (JP)

( * ) Notice: Subject to any disclaimer, the term of this patent is extended or adjusted under 35 U.S.C. 154(b) by 772 days.

(21) Appl. No.: 12/784,001

(22) Filed: May 20, 2010

(65) Prior Publication Data

US 2010/0302974 A1 Dec. 2, 2010

(30) Foreign Application Priority Data

May 22, 2009 (JP) ................................ 2009-124551
May 10, 2010 (JP) ................................ 2010-108232

(51) Int. Cl.
*H04L 12/28* (2006.01)
*G07C 5/08* (2006.01)
*G07C 5/00* (2006.01)

(52) U.S. Cl.
CPC .............. *G07C 5/008* (2013.01); *G07C 5/0808* (2013.01); *G07C 5/085* (2013.01); *G07C 2205/02* (2013.01)
USPC .......................................... 370/254; 710/316

(58) Field of Classification Search
CPC .......... H04W 4/04; H04L 12/26; H04L 12/28
USPC ........................ 370/254; 340/359.13; 701/19; 455/456.1
See application file for complete search history.

(56) References Cited

U.S. PATENT DOCUMENTS

2005/0143874 A1* 6/2005 Peltz et al. ...................... 701/19
2006/0264221 A1* 11/2006 Koike et al. ................ 455/456.1
2008/0186166 A1* 8/2008 Zhou et al. ............... 340/539.13
2010/0141430 A1* 6/2010 Steer ........................ 340/539.13

FOREIGN PATENT DOCUMENTS

JP 08-251702 9/1996
JP 2001-236103 8/2001
JP 2002-58052 2/2002
JP 2002-111702 4/2002

(Continued)

OTHER PUBLICATIONS

Japanese Office Action issued for Japanese Patent Application No. 2010-108232 dated Nov. 5, 2013.

*Primary Examiner* — Wei Zhao
*Assistant Examiner* — Lionel Preval
(74) *Attorney, Agent, or Firm* — Kratz, Quintos & Hanson, LLP

(57) ABSTRACT

There are provided a method and a device for providing communication data that provide communication data for identifying a device on a mobile object that communicates through an LAN in accordance with a predetermined communication protocol to the device on a mobile object installed on a mobile object without a communication data provision problem caused due to a manual operation, a data gathering method and a system for a mobile object using the method and the device, the device on a mobile object for the system, a network system for organizing vehicles, and an on-vehicle device for the system.

42 Claims, 14 Drawing Sheets

(56) References Cited

FOREIGN PATENT DOCUMENTS

| | | |
|---|---|---|
| JP | 2004-38242 | 2/2004 |
| JP | 2004-509540 | 3/2004 |
| JP | 2006-020117 | 1/2006 |
| JP | 2006-505216 | 2/2006 |
| JP | 2006-197486 | 7/2006 |
| JP | 2006-256457 | 9/2006 |
| WO | 02/25980 | 3/2002 |

* cited by examiner

FIG. 5

| DEVICE | CABLE LAN IP ADDRESS (FIXED VALUE) | WIRELESS LAN IP ADDRESS (GENERATED VALUE) |
|---|---|---|
| 122 | 192.168.1.1/24 | 172.16.25.1/16 |
| 123 | 192.168.1.2/24 | 172.16.25.2/16 |
| 121 | 192.168.1.254/24 | 172.16.25.9/16 |

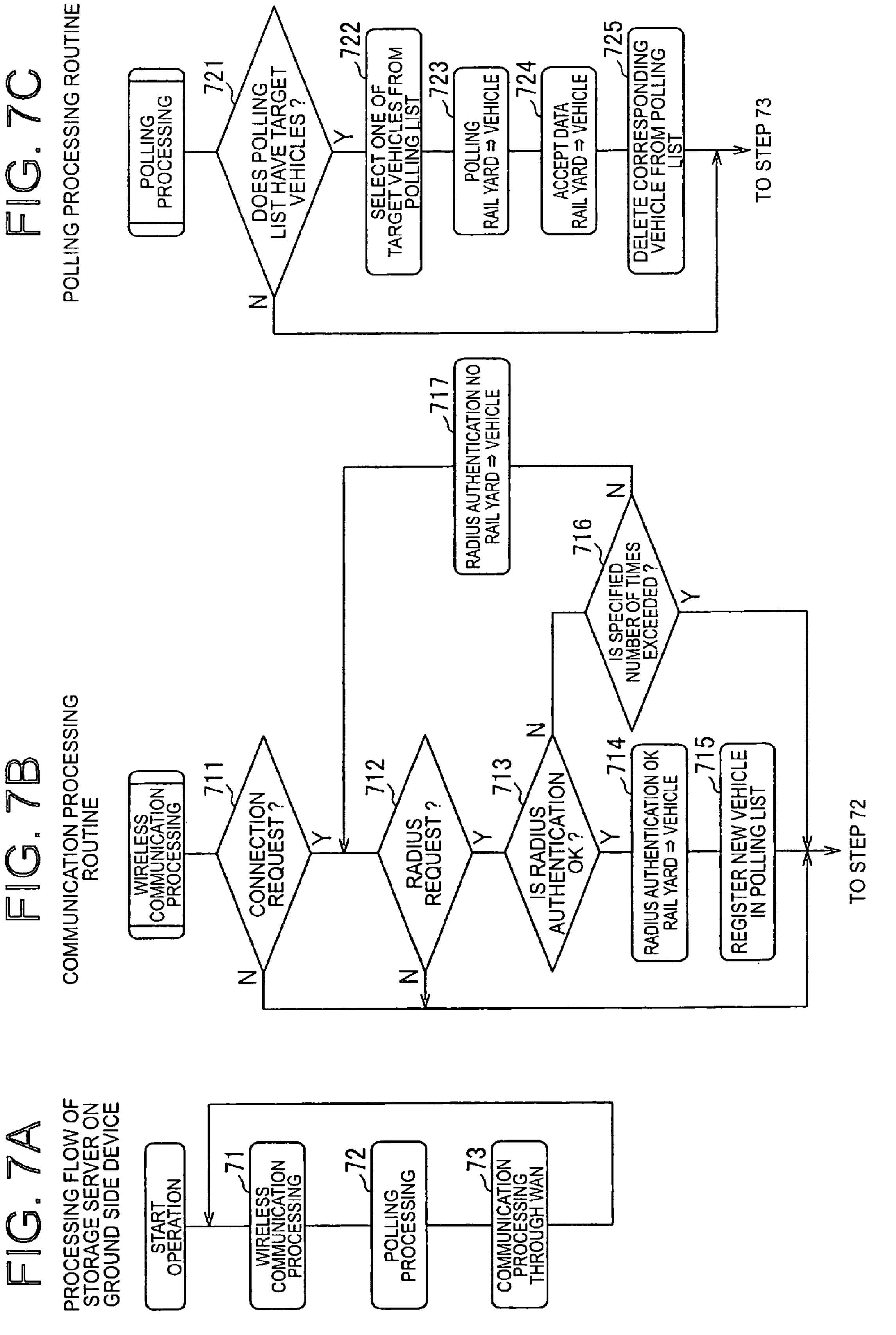
FIG. 7A
PROCESSING FLOW OF STORAGE SERVER ON GROUND SIDE DEVICE
START OPERATION
71
WIRELESS COMMUNICATION PROCESSING
72
POLLING PROCESSING
73
COMMUNICATION PROCESSING THROUGH WAN
FIG. 7B
COMMUNICATION PROCESSING ROUTINE
WIRELESS COMMUNICATION PROCESSING
711
CONNECTION REQUEST ?
Y
N
712
RADIUS REQUEST ?
Y
N
713
IS RADIUS AUTHENTICATION OK ?
Y
N
714
RADIUS AUTHENTICATION OK RAIL YARD ⇒ VEHICLE
715
REGISTER NEW VEHICLE IN POLLING LIST
TO STEP 72
716
IS SPECIFIED NUMBER OF TIMES EXCEEDED ?
Y
N
717
RADIUS AUTHENTICATION NO RAIL YARD ⇒ VEHICLE
FIG. 7C
POLLING PROCESSING ROUTINE
POLLING PROCESSING
721
DOES POLLING LIST HAVE TARGET VEHICLES ?
Y
N
722
SELECT ONE OF TARGET VEHICLES FROM POLLING LIST
723
POLLING RAIL YARD ⇒ VEHICLE
724
ACCEPT DATA RAIL YARD ⇒ VEHICLE
725
DELETE CORRESPONDING VEHICLE FROM POLLING LIST
TO STEP 73

METHOD AND A DEVICE FOR PROVIDING COMMUNICATION DATA, DATA GATHERING SYSTEM FOR A MOBILE OBJECT, A DEVICE ON THE MOBILE OBJECT FOR THE DATA GATHERING SYSTEM, A NETWORK SYSTEM FOR ORGANIZING VEHICLES, AND A ON-VEHICLE DEVICE FOR THE SYSTEM

BACKGROUND OF THE INVENTION

1. Field of the Invention

The present invention relates to a method and a device for providing communication data that provide the communication data including a communication address such as an IP (Internet Protocol) address that identifies a device on a mobile object at the time of communication with respect to the device on a mobile object that is installed on a mobile object like a vehicle that travels on, e.g., a track and constitutes at least a part of a network system that performs communication in accordance with a predetermined communication protocol such as Internet Protocol via an LAN (Local Area Network).

The present invention also relates to a data gathering system for a mobile object and a device on a mobile object for this system that collects mobile object information concerning a mobile object stored in a device on a mobile object, the device on a mobile object installed on a mobile object such as a vehicle traveling on a track communicating with a ground device that is installed on the ground by using wireless communication data including a communication address such as an IP address set to the device on a mobile object for identifying the device on a mobile object in accordance with a predetermined communication protocol such as Internet Protocol via a wireless LAN.

The present invention also relates to a network system for organizing vehicles and an on-vehicle device for the system, the on-vehicle device installed in each vehicle in a vehicle unit including a plurality of vehicles traveling on, e.g., a track performing communication by using communication data including a communication address such as an IP address set to the on-vehicle device for mutual identification in accordance with a predetermined communication protocol such as Internet Protocol via an LAN.

2. Description of the Related Art

There has heretofore been a data gathering system for a mobile object or a network system for organizing vehicles as a network system that is at least partially constituted of a device on a mobile object installed on a mobile object such as a vehicle traveling on a track and performs communication in accordance with a predetermined communication protocol such as Internet Protocol via an LAN (Local Area Network). As the conventional data gathering system for a mobile object, in the field of, e.g., railroad, there is known a system that records and stores vehicle information such as operation histories of many mounted devices mounted in each vehicle as a mobile object organizing a train in a recording medium in an on-vehicle device as the device on a mobile object installed in each vehicle, brings back this recording medium itself or another recording medium such as an IC card having information stored in the recording medium therein, and reads this information into a ground device installed on the ground from the recording medium to gather the vehicle information, thereby utilizing the gathered information to effect maintenance operations for the mounted devices at appropriate timings. Further, there is also known that vehicle information recorded and stored in a recording medium in an on-vehicle device is transmitted from the on-vehicle device to a ground device at predetermined fixed clock times or at fixed time intervals or by a manual operation via a serial transmission line to gather the vehicle information in the ground device (see, e.g., Patent Document 1).

In the former data gathering system for a mobile object, however, an operator must go the round of the vehicles gathered in, e.g., a large rail yard, manually bring out a recording medium from the ground device, and read vehicle information into the ground device from the recording medium, and collection of the vehicle information is a very troublesome operation.

Further, the latter data gathering system for a mobile object does not take a lot of trouble but has a problem that a public line network must be utilized to transmit vehicle information from the on-vehicle device on each vehicle of a train to the ground device via the serial transmission line while traveling and a communication charge is produced to increase a running cost.

Thus, as a system that does not take the trouble of gathering vehicle information and has no high running cost, there is considered a system that an on-vehicle device on each vehicle of trains gathered in a rail yard is connected with a ground device installed in the rail yard through a wireless LAN and vehicle information stored in a recording medium in the on-vehicle device is automatically gathered in the ground device installed in the rail yard via the wireless LAN.

Furthermore, as a conventional network system for organizing vehicles, there is known a system that monitors and controls an on-vehicle device including a terminal device such as each of various mounted devices mounted in each vehicle in a vehicle unit in the field of, e.g., railroad (see, e.g., Patent Document 2). Incidentally, as monitoring and control, there are monitoring a state of a specific on-vehicle device in each vehicle, e.g., a specific one of service devices such as an air-conditioning equipment in each vehicle and control over an operation of such a device, monitoring a state of a specific door or a brake in each vehicle and control over an operation of this device, and others. Moreover, a door, an air-conditioning device, a brake, an ATO (Automatic Train Operation), automatic announcement, SIV (Static Inverter), a motor and others correspond to the mounted devices.

Patent Document 1: Japanese Patent Application Laid-open No. 251702-1996

Patent Document 2: Japanese Patent Application Laid-open No. 2006-20117

In all the systems described above, when specifying a device on a mobile object or an on-vehicle device installed in each of many vehicles (which will be abbreviated to an "on-vehicle device" hereinafter) to perform communication in accordance with a predetermined communication protocol via an LAN, communication data such as a communication address in a format determined based on the communication protocol must be set to each on-vehicle device to specify the on-vehicle device. When the communication address is, e.g., an IP (Internet Protocol) address (which will be referred to as an "IP address" hereinafter), as provision for setting, there are a dynamic address providing scheme for preparing a server that manages IP addresses and automatically providing a temporal IP address in response to a request from an on-vehicle device and a static address providing scheme for providing a static IP address in advance.

When providing a dynamic IP address, a DHCP server having a dynamic host configuration protocol (which will be referred to as "DHCP" hereinafter) implemented therein is often used. In the DHCP server, a range of IP addresses that may be assigned to on-vehicle devices is set, an IP address is selected from the IP addresses that may be assigned to the on-vehicle devices, and the selected IP address is temporarily provided to the on-vehicle device that has accessed. When the on-vehicle device terminates communication using the IP address provided thereto, the DHCP server automatically collects the address and assigns it to another on-vehicle device.

When this DHCP is used, the trouble of setting communication data in a network can be omitted to readily achieve connection using an IP address. However, when the IP address automatic providing method based on this DHCP is utilized, a correspondence relationship between an on-vehicle device and an IP address changes with time, and hence there is a problem that managing the correspondence relationship between the on-vehicle device and the IP address is difficult. Additionally, when communication is interrupted and an IP address is again provided, the IP address of an on-vehicle device may be different from a previous one, there is a problem that access to the on-vehicle device has a disadvantage.

In case of providing a static IP address, since the static IP address is provided to each on-vehicle device in advance, a fluctuation in address that is observed in the dynamic address providing scheme can be avoided, and there is no problem involved by the fluctuation in address. However, as an operation of providing the static IP address to each on-vehicle device in advance, the static IP address that should be provided is manually input by a key operation. Therefore, an operator must go to a vehicle having an on-vehicle device as a provision target installed therein, which is troublesome, and a wrong static IP address may be possibly provided by an operation mistake of an operator. Further, this providing operation is performed in not only initial installation of each on-vehicle device but also malfunction, regular maintenance for each vehicle and remounting each on-vehicle device, and hence a frequency of the manual providing operation is very high.

When an on-vehicle device is erroneously specified due to a mistake in the manual providing operation and an address that is not a connection target is provided, communication cannot be achieved in some cases. Furthermore, for example, if an IP address is redundantly provided, on-vehicle devices may be confused.

Generally, in case of the wireless LAN, to mutually identify a ground device and some of on-vehicle devices and achieve wireless communication between them via the wireless LAN in accordance with a predetermined IP protocol, respective pieces of wireless communication data such as a user ID, a user password and others are set besides the IP address. In particular, when the on-vehicle devices adopt a cable LAN configuration, a routing table is also set as communication data. However, when the communication data including this routing table is provided by a manual operation, the same problem as that in case of the IP address occurs. Such a problem also occurs in a system that an on-vehicle device installed in each vehicle and a terminal device installed in each vehicle communicate with each other by utilizing different addresses preset to the on-vehicle device and each terminal device to monitor and control the terminal device such as each of various mounted devices mounted in each vehicle in a vehicle unit.

Therefore, in view of the above-described points, it is an object of the present invention to provide a method and a device for providing communication data that provide communication data for identifying a communicating device on a mobile object with respect to the device on a mobile object that is installed on the mobile object and constitutes at least a part of a network system that performs communication in accordance with a predetermined communication protocol through an LAN without a problem of manually providing the communication data.

In view of the above-described points, it is another object of the present invention to provide a data gathering system for a mobile object and a device on a mobile object for this system that gather mobile object information stored in each device on a mobile object in a ground device without a problem of manually providing wireless communication data.

In view of the above-described points, it is still another object of the present invention to provide a network system for organizing vehicles and an on-vehicle device for this system that have a configuration where a terminal device installed in each vehicle in a vehicle unit communicates with the on-vehicle device installed in the vehicle through an LAN in accordance with a predetermined communication protocol by using communication data set to the on-vehicle device for mutual identification without a problem of manually providing the communication data.

SUMMARY OF THE INVENTION

To achieve the object, according to the present invention there is provided a method for providing communication data that provides communication data, which is utilized to identify a device on a mobile object at the time of communication, to the device on a mobile object that is installed on a mobile object and constitutes at least a part of a network system that performs communication in accordance with a predetermined communication protocol through an LAN, the method comprising: generating the communication data that should be set to the device on a mobile object based on prepared data generation information representing the communication data predetermined in association with a mobile object identification code previously provided to the mobile object on which the device on a mobile object is installed to enable identifying the mobile object and the mobile object identification code of the mobile object on which the device on a mobile object to which the communication data should be set is installed; and providing the generated communication data to the device on a mobile object as the communication data that should be set to the device on a mobile object.

According to the method for providing communication data of the present invention, although the communication data that should be set to the device on a mobile object is provided to the device on a mobile object, the communication data to be provided is generated based on the prepared data generation information indicative of the communication data predetermined in association with a mobile object identification code previously provided to the mobile object on which the device on a mobile object is installed so as to enable identifying the mobile object and the mobile object identification code of the mobile object on which the device on a mobile object to which the communication data should be set is installed, and hence a static communication address that should be provided for setting the device on a mobile object does not have to be manually input by a key operation.

To achieve the object, according to the present invention, there is provided a device for providing communication data that provides communication data, which is utilized to identify a device on a mobile object at the time of communication, to the device on a mobile object that is installed on a mobile object and constitutes at least a part of a network system that performs communication in accordance with a predetermined communication protocol through an LAN, the device comprising: communication data providing means for providing to the device on a mobile object the communication data that should be set to the device on a mobile object and that is generated based on prepared data generation information representing the communication data predetermined in association with a mobile object identification code previously provided to the mobile object on which the device on a mobile object is installed to enable identifying the mobile object and the mobile object identification code of the mobile object on which the device on a mobile object to which the communication data should be set is installed.

According to the device for providing communication data of the present invention, although the communication data providing means provides the communication data that should be set to the device on a mobile object with respect to the device on a mobile object, this communication data to be provided is generated based on the prepared data generation information indicative of the communication data predetermined in association with the mobile object identification code previously provided to the mobile object on which the device on a mobile object is installed to enable identifying the mobile object and the mobile body identification code of the mobile object on which the device on a mobile object to which the communication data should be set is installed, and hence a static communication address that should be provided to set the device on a mobile object does not have to be input by a manual key operation.

The device for providing communication data further comprises communication data storing means for storing the communication data that should be set to the device on a mobile object and that is generated based on prepared data generation information representing the communication data predetermined in association with a mobile object identification code previously provided to the mobile object on which the device on a mobile object is installed to enable identifying the mobile object and the mobile object identification code of the mobile object on which the device to which the communication data should be set is installed, wherein the communication data providing means provides the communication data by reading out the communication data stored in the communication data storing means.

The device for providing communication data according to the present invention further includes the communication data storing means storing the communication data that should be set to the device on a mobile object, the communication data stored in the communication data storing means is generated based on the prepared data generation information indicative of the communication data predetermined in association with the mobile object identification code previously provided to the mobile object on which the device on a mobile object is installed to enable identifying the mobile object and the mobile object identification code of the mobile object on which the device on a mobile object to which the communication data should be set is installed, the communication data providing means reads out the communication data stored in the communication data storing means to provide the communication data, and hence provision of the communication data by the communication data providing means can be carried out based on the communication data stored in the communication data storing means, thereby providing the communication data for setting the device on a mobile object without inputting the communication data by a manual key operation.

The device for providing communication data further comprises: mobile object identification code storing means for storing a mobile object identification code previously provided to the mobile object on which the device on a mobile object is installed to enable identifying the mobile object; and communication data generating means for generating the communication data based on the mobile object identification code stored in the mobile object identification code storing means and the prepared data generation information representing the communication data predetermined in association with the mobile object identification code, wherein the communication data providing means provides the communication data based on the communication data generated by the communication data generating means.

The device for providing communication data of the present invention further includes the mobile object identification code storing means and the communication data generating means, the communication data generating means generates the communication data based on the mobile object identification code stored in the means for storing a mobile object identification code that is previously provided to the mobile object on which the device on a mobile object is installed to enable identifying the mobile object and the prepared data generation information indicative of the communication data predetermined in association with the mobile object identification code, the communication data providing means provides the generated communication data, and hence provision of the communication data by the communication data providing means can be effected based on the communication data generated by the communication data storing means, thereby providing the communication data for setting the device on a mobile object without being input by a manual key operation.

In the device for providing communication data, in particular, since the data generation information is an arithmetic expression configured to calculate and generate based on the mobile object identification code the communication data predetermined in association with the mobile object identification code, just preparing the arithmetic expression besides the mobile object identification code enables generating the wireless communication data that should be set to the device on a mobile object installed on the mobile object of the mobile object identification code or a wireless communication unit of the device on a mobile object.

In the device for providing communication data, in particular, since the communication protocol is Internet Protocol and the communication address is an Internet Protocol address, an existing device that uses an IP address can be used for a part of the device on a mobile object to constitute the device on a mobile object.

In the device for providing communication data, in particular, since the mobile object identification code storing means has a switch that can set electrically readable numerical values or characters, the mobile object identification code consisting of a decimal number having a plurality of digits can be easily stored by operating the switch.

To solve the above-described problem, according to the present invention, there is provided a data gathering system for a mobile object, comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device, the system comprising: wireless communication data providing means for providing to the device on a mobile object the wireless communication data that should be set to the device on a mobile object and that is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the communication data should be set is installed.

Further, to solve the above-described problem, according to the present invention, there is provided a data gathering system for a mobile object, comprising a ground device installed on the ground and a plurality of devices on a mobile object each of which is installed on a mobile object, each of the devices on a mobile object comprising an information storage unit having mobile object information storing means for storing mobile object information including at least one of first mobile object information concerning a mobile object itself on which the device on a mobile object is installed and second mobile object information concerning a device mounted in the mobile object and a wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying them being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device, the system comprising: wireless communication data providing means for providing to the wireless communication unit of the device on a mobile object the wireless communication data that should be set to the wireless communication unit of the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed.

The data gathering system for a mobile object according to the present invention includes the wireless communication data providing means that provides the device on a mobile object or the wireless communication unit of the device on a mobile object with the wireless communication data such as a static communication address, a routing table or an individual authentication code that should be set to the device on a mobile object or the wireless communication unit of the device on a mobile object, the wireless communication data provided by the wireless communication data providing means is generated based on the prepared data generation information indicative of the wireless communication data predetermined in association with the mobile object identification code previously provided to the mobile object on which the device on a mobile object is installed to enable identifying the mobile object and the mobile object identification code of the mobile object on which the device on a mobile object to which the wireless communication data should be set is installed, and hence the wireless communication data that should be provided for setting the device on a mobile object or the wireless communication unit of the device on a mobile object does not have to be input by a manual key operation.

The data gathering system for a mobile object further comprises wireless communication data storing means for storing the wireless communication data that should be set to the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed, wherein the wireless communication data providing means provides the wireless communication data by reading out the wireless communication data stored in the wireless communication data.

The data gathering system for a mobile object according to the present invention further includes the detachable wireless communication data storing means storing the wireless communication data that should be set to the device on a mobile object, the wireless communication data stored in the wireless communication data storing means is generated based on the prepared data generation information indicative of the wireless communication data predetermined in association with the mobile object identification code previously provided to the mobile object on which the device on a mobile object is set to enable identifying the mobile object and the mobile object identification code of the mobile object on which the device on a mobile object to which the wireless communication data should be set is installed, the wireless communication data providing means reads out the wireless communication data stored in the wireless communication data storing means to provide the wireless communication data, whereby provision of the wireless communication data by the wireless communication data providing means can be performed based on the wireless communication data stored in the detachable wireless communication data storing means and the wireless communication data can be provided for setting the device on a mobile object or the wireless communication unit of the device on a mobile object without being input a manual key operation.

The data gathering system for a mobile object further comprises: mobile object identification code storing means for storing a mobile object identification code previously provided to the mobile object on which the device on a mobile object is installed to enable identifying the mobile object; and wireless communication data generating means for generating the wireless communication data based on the mobile object identification code stored in the mobile object identification code storing means and prepared data generation information representing the wireless communication data predetermined in association with the mobile object identification code, wherein the wireless communication data providing means provides the wireless communication data based on the wireless communication data generated by the wireless communication data generating means.

According to the data gathering system for a mobile object of the present invention, the detachable mobile object identification code storing means and the wireless communication data generating means are further included, the wireless communication data generating means generates the wireless communication data based on the mobile object identification code that is previously provided to the mobile object on which the device on a mobile object is installed to enable identifying the mobile object and stored in the mobile object identification code storing means and the prepared data generation information indicative of the wireless communication data predetermined in association with the mobile object identification code, and the wireless communication data providing means provides the generated wireless communication data, whereby provision of the wireless communication data by the wireless communication data providing means can be effected based on the wireless communication data generated by the wireless communication data generating means and the wireless communication data can be provided to set the device on a mobile object or the wireless communication unit of the device on a mobile object without being input by a manual key operation.

In the data gathering system for a mobile object, in particular, since the data generation information is an arithmetic expression configured to calculate and generate wireless communication data for the wireless communication predetermined in association with a mobile object identification code based on the mobile object identification code, just preparing the arithmetic expression besides the mobile object identification code enables generating the wireless communication data which should be set to the device on a mobile object that is installed on the mobile object having the mobile object identification code or the wireless communication unit in the device on a mobile object.

In the data gathering system for a mobile object, in particular, since the mobile object is a vehicle that travels on a track and the ground device is installed to enable communication with the device on a mobile object that is installed in the vehicle, vehicle information stored in the device on a mobile object by the ground device can be collected.

In the data gathering system for a mobile object, in particular, since the communication protocol is Internet Protocol and the communication address is an IP address, an existing device that uses IP addresses can be utilized for a part of the device on a mobile object to constitute the device on a mobile object.

In the data gathering system for a mobile object, in particular, since the device on a mobile object includes the mobile object identification code storing means and the wireless communication data generating means besides the wireless communication data providing means, the device on a mobile object can generate the wireless communication data that should be set to the device on a mobile object and provide this data to itself.

In the data gathering system for a mobile object, in particular, the data storage unit in the device on a mobile object includes mobile object identification code storing means and wireless communication data generating means besides the wireless communication data providing means, and the wireless communication data providing means provides the wireless communication data based on the wireless communication data generated by the wireless communication data generating means, whereby the information storage unit can generate the wireless communication data that should be set to the wireless communication unit and provide the generated data to the wireless communication unit.

In the data gathering system for a mobile object, in particular, since the mobile object identification code storing means is detachably disposed to the information storage unit, the mobile object identification code storing means can be removed to be diverted even if the information storage unit is replaced, and the mobile object identification code storing means having a mobile object identification code stored therein does not have to be newly prepared.

In the data gathering system for a mobile object, in particular, since the device on a mobile object or the wireless communication unit in the device on a mobile object uses the wireless communication data set to itself to perform wireless communication with the ground device every time an operation key of the mobile object is turned off when communication with the ground device is possible, the ground device can accurately collect the mobile object information stored during an operation while the operation key of the mobile object is OFF and stopped.

In the data gathering system for a mobile object, since the wireless communication data providing means performs an operation of providing the wireless communication data before starting the wireless communication every time the operation key of the mobile object is turned off, even if the set wireless communication data is lost, the wireless communication data required for communication is assuredly set when the mobile object is stopped by turning off the operation key to stop the mobile object, whereby the mobile object information stored during an operation can be accurately collected by the ground device.

To solve the above-described problem, according to the present invention, there is provided a device on a mobile object for a data gathering system for a mobile object, the device of which has mobile object information storing means that is installed in each of a plurality of mobile objects and stores mobile object information including at least one of first mobile object information concerning an installed mobile object itself and second mobile object information concerning a device mounted in the mobile object and is connected to a ground device installed on the ground through a wireless LAN to constitute a data gathering system for a mobile object, wireless communication data configured to effect wireless communication with the ground device by performing mutual identification through the wireless LAN in accordance with a predetermined wireless communication protocol, the device being connected with the ground device through the wireless LAN based on the wireless communication with the ground device using the set wireless communication data, the mobile object information stored in the mobile object information storing means being collected by the ground device, the device on a mobile object comprising: wireless communication data providing means for providing to itself the wireless communication data that should be set and is generated based on prepared data generation information representing the wireless communication data predetermined in association with a mobile object identification code previously provided to the mobile object to be installed so as to enable identifying the mobile object and the mobile object identification code of the installed mobile object.

Further, to solve the above-described problem, according to the present invention, there is provided a device on a mobile object for a data gathering system for a mobile object, the device being installed in each of a plurality of mobile objects and comprising: an information storage unit having mobile object information storing means for storing mobile object information including at least one of first mobile object information concerning an installed mobile object itself and second mobile object information concerning a device mounted in the mobile object; and a wireless communication unit that is mutually connected to the information storage unit by mutually effecting cable communication through a cable LAN based on a predetermined cable communication protocol and performs wireless communication with the ground device through a wireless LAN based on a predetermined wireless communication protocol, wireless communication data configured to perform wireless communication between the ground device, the wireless communication unit and the information storage unit through the wireless LAN based on a predetermined communication protocol by mutual identification being set to the wireless communication unit, the device on a mobile object being connected to the ground device through the wireless LAN based on wireless communication using the set wireless communication data, the mobile object information stored in the mobile object information storing means of the information storage unit being collected by the ground device, the device on a mobile object comprising: wireless communication data providing means for providing to the wireless communication unit the wireless communication data that should be set to the wireless communication unit of itself and is generated based on prepared data generation information representing the wireless communication data predetermined in association with a mobile object identification code previously provided to the mobile object to be installed so as to enable identifying the mobile object and the mobile object identification code of the installed mobile object.

According to the device on a mobile object for the data gathering system for a mobile object of the present invention, although the wireless communication data providing means provides the device on a mobile object or the wireless communication unit in the device on a mobile object with the wireless communication data that should be set to the device on a mobile object or the wireless communication unit in the device on a mobile object, since the wireless communication data provided by the wireless communication data providing means is generated based on the prepared data generation information indicative of the wireless communication data predetermined in association with the mobile object identification code previously provided to the mobile object on which the device on a mobile object is installed to enable identifying the mobile object and the mobile objet identification code of the mobile object on which the device on a mobile object to which the wireless communication data should be set is installed, a static communication address that should be provided for configuring a setting of the device on a mobile object or the wireless communication unit in the device on a mobile object does not have to be input by a manual key operation.

To solve the above-described problem, according to the present invention, there is provided a method for providing wireless communication data, the method providing the wireless communication data to a device on a mobile object in a data gathering system for a mobile object, the system comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device, wherein the wireless communication data that should be set to the device on a mobile object is generated based on prepared data generation information representing the wireless communication data predetermined in association with a mobile object identification code previously provided to the mobile object on which the device on a mobile object is installed to enable identifying the mobile object and the wireless mobile object identification code of the mobile object on which the device on a mobile object to which the communication data should be set is installed, and the generated wireless communication data is provided to the device on a mobile object as the wireless communication data that should be set to the device on a mobile object.

Moreover, to solve the above-described problem, according to the present invention, there is provided a method for providing wireless communication data, the method providing the wireless communication data to a wireless communication unit of a device on a mobile object in a data gathering system for a mobile object, the system comprising a ground device installed on the ground and a plurality of devices on a mobile object each of which is installed on a mobile object, each of the devices on a mobile object comprising information storage unit having mobile object information storing means for storing mobile object information including at least one of first mobile object information concerning a mobile object itself on which the device on a mobile object is installed and second mobile object information concerning a device mounted in the mobile object and a wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying them being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device, wherein the wireless communication data that should be set to the wireless communication unit of the device on a mobile object is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed, and the generated wireless communication data is provided to the wireless communication unit in the device on a mobile object as the wireless communication data that should be set to the wireless communication unit in the device on a mobile object.

According to the method for providing wireless communication data of the present invention, although the wireless communication data that should be set to the device on a mobile object or the wireless communication unit in the device on a mobile object is provided to the device on a mobile object or the wireless communication unit in the device on a mobile object, since the wireless communication data to be provided is generated based on the prepared data generation information indicative of the wireless communication data predetermined in association with the mobile object identification code previously provided to the mobile object on which the device on a mobile object is installed to enable identifying the mobile object and the mobile object identification code of the mobile object on which the device on a mobile object to which the wireless communication data should be set is installed, a static communication address that should be provided to configure a setting of the device on a mobile object or the wireless communication unit in the device on a mobile object does not have to be input by a manual key operation.

To solve the above-described problem, according to the present invention, there is provided a device for providing wireless communication data, the device providing the wireless communication data to a device on a mobile object in a data gathering system for a mobile object, the system comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device, the device comprising: wireless communication data providing means for providing to the device on a mobile object the communication data that should be set to the device on a mobile object and that is generated based on prepared data generation information representing the wireless communication data predetermined in association with a mobile object identification code previously provided to the mobile object on which the device on a mobile object is installed to enable identifying the mobile object and the wireless mobile object identification code of the mobile object on which the device on a mobile object to which the communication data should be set is installed.

To solve the above-described problem, according to the present invention, there is provided a device for providing wireless communication data, the device providing the wireless communication data to a wireless communication unit in a data gathering system for a mobile object, the system comprising a ground device installed on the ground and a plurality of devices on a mobile object each of which is installed on a mobile object, each of the devices on a mobile object comprising information storage unit having mobile object information storing means for storing mobile object information including at least one of first mobile object information concerning a mobile object itself on which the device on a mobile object is installed and second mobile object information concerning a device mounted in the mobile object and a wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying them being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device, the device comprising: wireless communication data providing means for providing to the wireless communication unit of the device on a mobile object the wireless communication data that should be set to the wireless communication unit of the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed.

According to the device for providing wireless communication data of the present invention, although the wireless communication data that should be set to the device on a mobile object or the wireless communication unit in the device on a mobile object is provided to the device on a mobile object or the wireless communication unit in the device on a mobile object, since the wireless communication data to be provided is generated based on the prepared data generation information indicative of the wireless communication data predetermined in association with the mobile object identification code previously provided to the mobile object on which the device on a mobile object is installed to enable identifying the mobile object and the mobile object identification code of the mobile object on which the device on a mobile object to which the wireless communication data should be set is installed, a static communication address that should be provided to configure a setting of the device on a mobile object or the wireless communication unit in the device on a mobile object does not have to be input by a manual key operation.

To solve the above-described problem, according to the present invention, there is provided a network system for organizing vehicles comprising an on-vehicle device installed in each vehicle in a vehicle unit including a plurality of vehicles each traveling on a track, communication data utilized to communicate by mutually identifying the on-vehicle devices through a vehicle unit LAN in accordance with a predetermined communication protocol being set to the on-vehicle devices, the on-vehicle devices being connected to each other through the vehicle unit LAN by communication using the set communication data, the system comprising: communication data providing means for providing to the on-vehicle device the communication data that should be set to the on-vehicle device and is generated based on prepared data generation information representing the communication data predetermined in accordance with a vehicle identification code previously provided to the vehicle in which the on-vehicle device is installed to enable identifying the vehicle and the vehicle identification code of the vehicle in which the on-vehicle device to which the communication data should be set is installed.

To solve the above-described problem, according to the present invention, there is provided a network system for organizing vehicles comprising an on-vehicle device installed in each vehicle in a vehicle unit including a plurality of vehicles each traveling on a track, the on-vehicle device having a plurality of terminal devices and a network control device that is mutually connected to the plurality of terminal devices by mutually performing communication through an in-vehicle LAN in accordance with a predetermined communication protocol and also communicates with the on-vehicle devices installed in the other vehicles through a vehicle unit LAN in accordance with the predetermined communication protocol, communication data configured to perform communication by mutually identifying the terminal devices installed in all the vehicles in the vehicle unit and the network control devices installed in the other vehicles through the vehicle unit LAN in accordance with the predetermined communication protocol being set to the network control device, the on-vehicle devices being connected to each other through the vehicle unit LAN based on communication using the set communication data, the system comprising: communication data providing means for providing to the plurality of terminal devices and the network control device in the on-vehicle device the communication data that is generated to be set to the plurality of terminal devices and the network control device in the on-vehicle device based on prepared data generation information representing the communication data predetermined in association with a vehicle identification code previously provided to the vehicle in which the on-vehicle device is installed to enable identifying the vehicle and the vehicle identification code of the vehicle in which the on-vehicle device to which the communication data should be set is installed.

According to the network system for organizing vehicles of the present invention, this network system includes the communication data providing means for providing the on-vehicle device or the plurality of terminal devices and the network control device of the on-vehicle device with the communication data that should be set to the on-vehicle device or the plurality of terminal devices and the network control device of the on-vehicle device, the communication data provided by the communication data providing means is generated based on the prepared data generation information indicative of the communication data predetermined in association with the vehicle identification code previously provided to each vehicle in a vehicle unit on which the on-vehicle device is installed to enable identifying the vehicle and the vehicle identification code of the vehicle on which the on-vehicle device to which the communication data should be set is installed, whereby the communication data that should be provided to configure a setting of the on-vehicle device or the plurality of terminal devices and the network control device in the on-vehicle device does not have to be input by a manual key operation.

The network system for organizing vehicles further comprises communication data storing means for storing the communication data that should be set to the on-vehicle device or the plurality of terminal devices and the network control device in the on-vehicle device and is generated based on prepared data generation information representing the communication data predetermined in association with a vehicle identification code previously provided to the vehicle in which the on-vehicle device is installed to enable identifying the vehicle and the vehicle identification code of the vehicle in which the on-vehicle device to which the communication data should be set is installed, wherein the communication data providing means provides the communication data by reading out the communication data stored in the communication data storing means.

According to the network system for organizing vehicles of the present invention, this network system further includes the communication data storing means having the communication data that should be set to the on-vehicle device stored therein, the communication data stored in the communication data storing means is generated based on the prepared data generation information indicative of the communication data predetermined in association with the vehicle identification code previously provided to the vehicle on which the on-vehicle device is installed to enable identifying the vehicle and the vehicle identification code of the mobile object on which the on-vehicle device to which the communication data should be set is installed, and the communication data providing means provides the communication data by reading out the communication data stored in the communication data storing means. Therefore, the communication data providing means can provide the communication data based on the communication data stored in the communication data storing means, and the communication data can be provided to configure a setting of the on-vehicle device or the plurality of terminal devices and the network control device in the on-vehicle device without inputting the communication data by a manual key operation.

The network system for organizing vehicles further comprises: vehicle identification code storing means for storing a vehicle identification code previously provided to the vehicle in which the on-vehicle device is installed to enable identifying the vehicle; and communication data generating means for generating the communication data based on the vehicle identification code stored in the vehicle identification code storing means and prepared data generation information representing the communication data predetermined in association with the vehicle identification code, wherein the communication data providing means provides the communication data based on the communication data generated by the communication data generating means.

According to the network system for organizing vehicles of the present invention, the vehicle identification code storing means and the communication data generating means are further provided, the communication data generating means generates the communication data based on the vehicle identification code stored in the vehicle identification code storing means previously provided to the vehicle in which the on-vehicle device is installed to enable identifying the vehicle and the prepared data generation information indicative of the wireless communication data predetermined in association with the vehicle identification code, and the communication data providing means provides the generated communication data. Therefore, the communication data providing means can provide the communication data based on the communication data generated by the communication data generating means, and the communication data can be provided to configure a setting of the vehicle device or the plurality of terminal devices and the network control device of the vehicle device without inputting the communication data by a manual key operation.

In the network system for organizing vehicles, in particular, since the data generation information is an arithmetic expression configured to calculate and generate based on the vehicle identification code the communication data for the communication predetermined in association with the vehicle identification code, just preparing the arithmetic expression besides the vehicle identification code enables generating the communication data that should be set to the vehicle device installed in the vehicle having the vehicle identification code or the plurality of terminal devices and the network control device of the on-vehicle device.

To solve the above-described problem, according to the present invention, there is provided an on-vehicle device for a network system for organizing vehicles, the on-vehicle device being installed in each vehicle in a vehicle unit including a plurality of vehicles each traveling on a track and connected through a vehicle unit LAN to constitute the network system for organizing vehicles, communication data configured to perform communication by mutual identification through the vehicle unit LAN in accordance with a predetermined communication protocol being set, the on-vehicle device being connected through the vehicle unit LAN based on communication using the set communication data, the on-vehicle device comprising: communication data providing means for providing to itself the communication data that should be set and is generated based on prepared data generation information representing the communication data predetermined in association with a vehicle identification code previously provided to the vehicle to be installed to enable identifying the vehicle and the vehicle identification code of the installed vehicle.

To solve the above-described problem, according to the present invention, there is provided an on-vehicle device for a network system for organizing vehicles, the on-vehicle device being installed in each vehicle in a vehicle unit including a plurality of vehicles each traveling on a track and connected through a vehicle unit LAN to constitute the network system for organizing vehicles, the on-vehicle device having a plurality of terminal devices and a network control device that is mutually connected with the plurality of terminal devices by performing mutual communication through an in-vehicle LAN in accordance with a predetermined communication protocol and performs communication through the vehicle unit LAN in accordance with the predetermined communication protocol, communication data configured to perform communication between the terminal devices installed in all the vehicles in the vehicle unit and the network control devices installed in the other vehicles by mutual identification through the vehicle unit LAN in accordance with the predetermined communication protocol being set to the network control device, the on-vehicle devices being connected to each other through the vehicle unit LAN based on communication using the set communication data, the on-vehicle device comprising: communication data providing means for providing to the plurality of terminal devices and the network control device the communication data that is generated to be set to the plurality of terminal devices and the network control device of itself based on prepared data generation information representing the communication data predetermined in association with a vehicle identification code previously provided to the vehicle to be installed to enable identifying the vehicle unit LAN and the vehicle identification code of the installed vehicle.

According to the on-vehicle device for the network system for organizing vehicles of the present invention, although the communication data that should be set to the on-vehicle device or the plurality of terminal devices and the network control device in the on-vehicle device is provided to the on-vehicle device or the plurality of terminal devices and the network control device in the on-vehicle device by the communication data providing means, the communication data provided by the communication data providing means is generated based on the prepared data generation information indicative of the communication data predetermined in association with the vehicle identification code previously provided to the vehicle in which the on-vehicle device is installed to enable identifying the vehicle and the vehicle identification code of the vehicle in which the on-vehicle device to which the communication data should be set is installed, and hence the communication data that should be provided to configure a setting of the on-vehicle device or the plurality of terminal devices and the network control device in the on-vehicle device does not have to be input by a manual key operation.

To solve the problem, according to the present invention, there is provided a method for providing communication data for a network system for organizing vehicles, the method providing communication data to an on-vehicle device in the network system for organizing vehicles, the system comprising the on-vehicle device installed in each vehicle in a vehicle unit including a plurality of vehicles each traveling on a track, the communication data configured to perform communication between the on-vehicle devices by mutual identification through a vehicle unit LAN in accordance with a predetermined communication protocol being set to the on-vehicle device, the on-vehicle devices being connected to each other through the vehicle unit LAN based on communication using the set communication data, wherein the communication data that should be set is generated based on prepared data generation information representing the communication data predetermined in association with a vehicle identification code previously provided to the vehicle in which on-vehicle device is installed to enable identifying the vehicle and the vehicle identification code of the vehicle in which the on-vehicle device to which the communication data should be set is installed, and the generated communication data is provided to the on-vehicle device as the communication data that should be set.

To solve the problem, according to the present invention, there is provided a method for providing communication data for a network system for organizing vehicles, the method providing communication data to a plurality of terminal devices and a network control device in the network system for organizing vehicles, the system comprising an on-vehicle device installed in each vehicle in a vehicle unit including a plurality of vehicles each traveling on a track, the on-vehicle device having the plurality of terminal devices and the network control device that is mutually connected to the plurality of terminal devices by performing mutual communication through an in-vehicle LAN in accordance with a predetermined communication protocol and performs communication with the on-vehicle devices installed in the other vehicles through a vehicle unit LAN in accordance with the predetermined communication protocol, the communication data configured to perform communication between the terminal devices installed in all the vehicles in the vehicle unit and the network control devices installed in the other vehicles by performing mutual identification through the vehicle unit LAN in accordance with the predetermined communication protocol being set to the network control device, the on-vehicle devices being connected to each other through the vehicle unit LAN based on communication using the set communication data, wherein the communication data that should be set to the network control device in the on-vehicle device is generated based on prepared data generation information representing the communication data predetermined in association with a vehicle identification code previously provided to the vehicle in which the on-vehicle device is installed to enable identifying the vehicle and the vehicle identification code of the vehicle, and the generated communication data is provided to the plurality of terminal devices and the network control device in the on-vehicle device as the communication data that should be set to the network control unit in the on-vehicle device.

According to the method for providing communication data for the network system for organizing vehicle of the present invention, although the communication data that should be set to the on-vehicle device or the plurality of terminal devices and the network control device in the on-vehicle device is provided to the on-vehicle device or the plurality of terminal devices and the network control device in the on-vehicle device, since this communication data to be provided is generated based on the prepared data generation information indicative of the communication data predetermined in association with the vehicle identification code previously provided to the vehicle in which the on-vehicle device is installed to enable identifying the vehicle and the vehicle identification code of the vehicle in which the on-vehicle device to which the communication data should be set is installed, the communication data that should be provided to configure a setting of the on-vehicle device or the plurality of terminal devices and the network control device in the on-vehicle device does not have to be input by a manual key operation.

To solve the problem, according to the present invention, there is provided a device for providing communication data for a network system for organizing vehicles, the device providing the communication data to an on-vehicle device in the network system for organizing vehicles, the system comprising the on-vehicle device installed in each vehicle in a vehicle unit including a plurality of vehicles each traveling on a track, the communication data configured to perform communication between the on-vehicle devices by performing mutual identification through a vehicle unit LAN in accordance with a predetermined communication protocol being set to the on-vehicle device, the on-vehicle devices being connected to each other through the vehicle unit LAN based on communication using the set communication data, the device comprising: communication data providing means for providing to the on-vehicle device the communication data that should be set to the on-vehicle device and is generated based on prepared data generation information representing the communication data predetermined in association with a vehicle identification code previously provided to the vehicle in which the on-vehicle device is installed to enable identifying the vehicle and the vehicle identification code of the vehicle in which on-vehicle device to which the communication data should be set is installed.

To solve the above-described problem, according to the present invention, there is provided a device for providing communication data for a network system for organizing vehicles, the device providing communication data to a plurality of terminals and a network control device in the network system for organizing vehicles, the system comprising an on-vehicle device installed in each vehicle in a vehicle unit including a plurality of vehicles each traveling on a track, the on-vehicle device having the plurality of terminal devices and a network control device that is mutually connected to the plurality of terminal devices by performing mutual communication through an in-vehicle LAN in accordance with a predetermined communication protocol and performs communication with the on-vehicle devices installed in the other vehicles through a vehicle unit LAN in accordance with the predetermined communication protocol, the communication data configured to perform communication between the terminal devices installed in all the vehicles in the vehicle unit and the network control devices installed in the other vehicles by performing mutual identification through the vehicle unit LAN in accordance with the predetermined communication protocol, the on-vehicle devices being connected to each other through the vehicle unit LAN based on communication using the set communication data, the device comprising: communication data providing means for providing to the plurality of terminal devices and the network control device in the on-vehicle device the communication data that should be set to the plurality of terminal devices and the network control device in the on-vehicle device and is generated based on prepared data generation information representing the communication data predetermined in association with a vehicle identification code previously provided to the vehicle in which the on-vehicle device is installed to enable identifying the vehicle and the vehicle identification code of the vehicle in which the on-vehicle device to which the communication data should be set is installed.

According to a device for providing communication data of the network system for organizing vehicles of the present invention, although the communication data that should be set to the on-vehicle device or the plurality of terminal devices and the network control device in the on-vehicle device is provided to the on-vehicle device or the plurality of terminal devices and the network control device in the on-vehicle device, since this communication data to be provided is generated based on the prepared data generation information indicative of communication data predetermined, in association with a vehicle identification code previously provided to the vehicle in which the plurality of terminal devices and the network control device in the on-vehicle device are installed to enable identifying the vehicle and the vehicle identification code previously provided to the vehicle in which the plurality of terminal devices and the network control device of the vehicle device to which the communication data should be set are installed, the communication data that should be provided to configure a setting of the on-vehicle device or the plurality of terminal devices and the network control device of the vehicle device does not have to be input by a manual key operation.

According to the present invention, since the communication data that should be provided to configure a setting of the device on a mobile object does not have to be input by using a manual key operation, a user does not have to go to the mobile object on which the device on a mobile object as a provision target is installed, and the method and the device for providing communication data that can avoid not only taking the trouble but also providing wrong communication data by a manual operation error even though communication data is frequently provided.

According to the present invention, since the communication data can be provided based on the communication data stored in the storing means and the communication data is stored in the storing means by writing in the storing means the communication data automatically generated based on the prepared data generation information indicative of the communication data predetermined in association with the mobile object identification code and the mobile object identification code of the mobile object on which the device on a mobile object to which the communication data should be set is installed, whereby the communication data does not have to be input by a manual key operation.

According to the present invention, since the communication data is automatically generated based on the prepared data generation information indicative of the communication data predetermined in association with the mobile object identification code and the mobile object identification code of the mobile object on which the device on a mobile object to which the communication data should be set is installed, the trouble, e.g., storing the communication data in the storing means in advance is not required.

According to the present invention, since just preparing the arithmetic expression as the data generation information besides the mobile object identification code enables generating the communication data that should be set to the device on a mobile object installed in the mobile object having the mobile object identification code or the wireless communication unit in the device on a mobile object, even if the number of mobile objects each having the device on a mobile object installed thereon increases, just preparing the device on a mobile object having different means for storing the mobile object identification code can cope with this increase.

According to the present invention, since an existing device having an IP address can be utilized as a part of the device on a mobile object to constitute the device on a mobile object, thereby diverting an existing unit for configuration.

According to the present invention, the mobile object identification code including a number having a plurality of digits or characters can be readily stored by operating the switch.

According to the present invention, since the wireless communication data such as a static communication address, a routing table or an individual authentication code that should be provided to configure a setting of the device on a mobile object or the wireless communication unit in the device on a mobile object does not have to be input by a manual key operation, the data gathering system for a mobile object, the device on a mobile object for the system, and the method and the device for providing wireless communication data in the system that can eliminate the need for going to the mobile object on which the device on a mobile object as a provision target is installed and can avoid not only taking the trouble but also providing wrong communication data by a manual operation error even if the wireless communication data is frequently provided can be obtained.

According to the present invention, the wireless communication data is provided based on the wireless communication data stored in the detachable storing means, the wireless communication data can be stored in the storing means by writing in the removed storing means the wireless communication data automatically generated based on the prepared data generation information indicative of the wireless communication data predetermined in association with the mobile object identification code and the mobile object identification code of the mobile object on which the device on a mobile object to which the wireless communication data should be set is installed, and the wireless communication data does not have to be input by a manual key operation.

According to the present invention, since the wireless communication data is automatically generated based on the prepared data generation information indicative of the wireless communication data predetermined in association with the mobile object identification code and the mobile object identification code of the mobile object on which the device on a mobile object to which the wireless communication data should be set is installed, the trouble of, e.g., storing the wireless communication data in the storing means in advance is not required.

According to the present invention, since just preparing the arithmetic expression as the data generation information besides the mobile object identification code enables generating the wireless communication data that should be set to the device on a mobile object installed in the mobile object having the mobile object identification code or the wireless communication unit of the device on a mobile object, even if the number of mobile objects each having the device on a mobile object installed thereon increases, just preparing the device on a mobile object having different means for storing the mobile object identification codes enables coping with this increase.

According to the present invention, the ground device can collect the vehicle information stored in the device on a mobile object installed in the vehicle traveling on a track.

According to the present invention, since an existing unit that uses an IP address can be diverted to a part of the device on a mobile object to constitute the device on a mobile object, thereby utilizing the existing unit to configure the system at a low cost.

According to the present invention, the wireless communication data that should be set to the device on a mobile object can be generated by the device on a mobile object to be provided to itself. Further, when the wireless communication data that should be set to the wireless communication unit is generated by the information storage unit to be provided to the wireless communication unit, the existing unit can be diverted to the wireless communication unit without modifying the wireless communication unit, thereby configuring the device on a mobile object and the system at a low cost.

According to the present invention, the mobile object identification code including a number having a plurality of digits or characters can be readily stored by operating the switch. Furthermore, even if the information storage unit is replaced, the mobile object identification code storing means can be removed to be diverted, and the mobile object identification code storing means having a mobile object identification code stored therein does not have to be newly prepared. Therefore, the replacement of the information storage unit can be inexpensively carried out, and wrong mobile object identification code storing means can be prevented from being disposed since the original mobile object identification code storing means can be attached.

According to the present invention, since the mobile object information stored during an operation can be accurately collected by the ground device while the operation key of the mobile object is OFF and stopped, the mobile object information can be collected when, e.g., the mobile object has finished daily travel, and the collected information can be provided for maintenance at the end of the daily travel.

According to the present invention, even if the set wireless communication data is lost, the wireless communication data required for communication is assuredly set when the mobile object is stopped by turning off the operation key thereof, and the mobile object information stored during an operation is accurately collected by the ground device. Therefore, it is possible to avoid a situation that the wireless communication is lost to disable wireless communication at the time of collecting the mobile object information and the mobile object information cannot be collected.

According to the present invention, the information storage unit can be configured to be independent from the wireless communication unit and an existing unit can be diverted to configure the wireless communication unit, thereby obtaining the inexpensive data gathering system for a mobile object that does not provide a wrong static communication address by a manual operation mistake.

According to the present invention, even if the information storage unit is replaced, since the vehicle number storing means can be removed to cope with this replacement and a vehicle number does not have to be newly written into the vehicle number storing means, the data gathering system for a mobile object that inexpensively enables replacement of the information storage unit can be obtained.

According to the present invention, the information storage unit is configured to be independent from the wireless communication unit, and a existing unit that has widely spread for the Internet can substitute for the wireless communication unit, thereby obtaining the data gathering system for a mobile object.

According to the present invention, since a static IP address that should be provided for a setting does not have to be input by a manual key operation, a user does not have to go to the mobile object on which the device on a mobile object as a provision target is installed, not only the trouble can be eliminated, but also and the device on a mobile object in the data gathering system for a mobile object that does not provide a wrong static IP address by a manual operation error even if static IP addresses are frequently provided can be obtained.

According to the present invention, there can be obtained the network system for organizing vehicles and the on-vehicle device for the system that do not have to perform a manual key operation to input the communication data that should be provided to configure a setting of the on-vehicle device or the plurality of terminal devices and the network control device of the on-vehicle device.

According to the present invention, the communication data providing means can provide the communication data based on the communication data stored in the communication data storing means, and the communication data can be provided to configure a setting of the on-vehicle device or the plurality of terminal devices and the network control device of the on-vehicle device without being input by a manual key operation.

According to the present invention, the communication data providing means can provide the communication data based on the communication data generated by the communication data generating means, and the communication data can be provided to configure a setting of the on-vehicle device or the plurality of terminal devices and the network control device of the on-vehicle device without being input by a manual key operation.

According to the present invention, there can be provided the method and the device for providing the communication data in the network system for organizing vehicles that can eliminate the need for using a manual key operation to input the communication data that should be provided to configure a setting of the on-vehicle device or the plurality of terminal devices and the network control device of the on-vehicle device.

BRIEF DESCRIPTION OF THE DRAWINGS

FIG. 5 is a view showing an example of a routing table;

FIGS. 7A, 7B and 7C are explanatory views of processing flows of the ground device installed on the ground, where FIG. 7A shows a processing flow of a main routine indicative of processing executed by a collection server unit in the ground device, FIG. 7B shows a flowchart representing detailed contents of a communication processing routine of the ground device, and FIG. 7C is a flowchart showing detailed contents of a polling processing routine of the ground device;

DETAILED DESCRIPTION OF THE PREFERRED EMBODIMENTS

Figure 1:
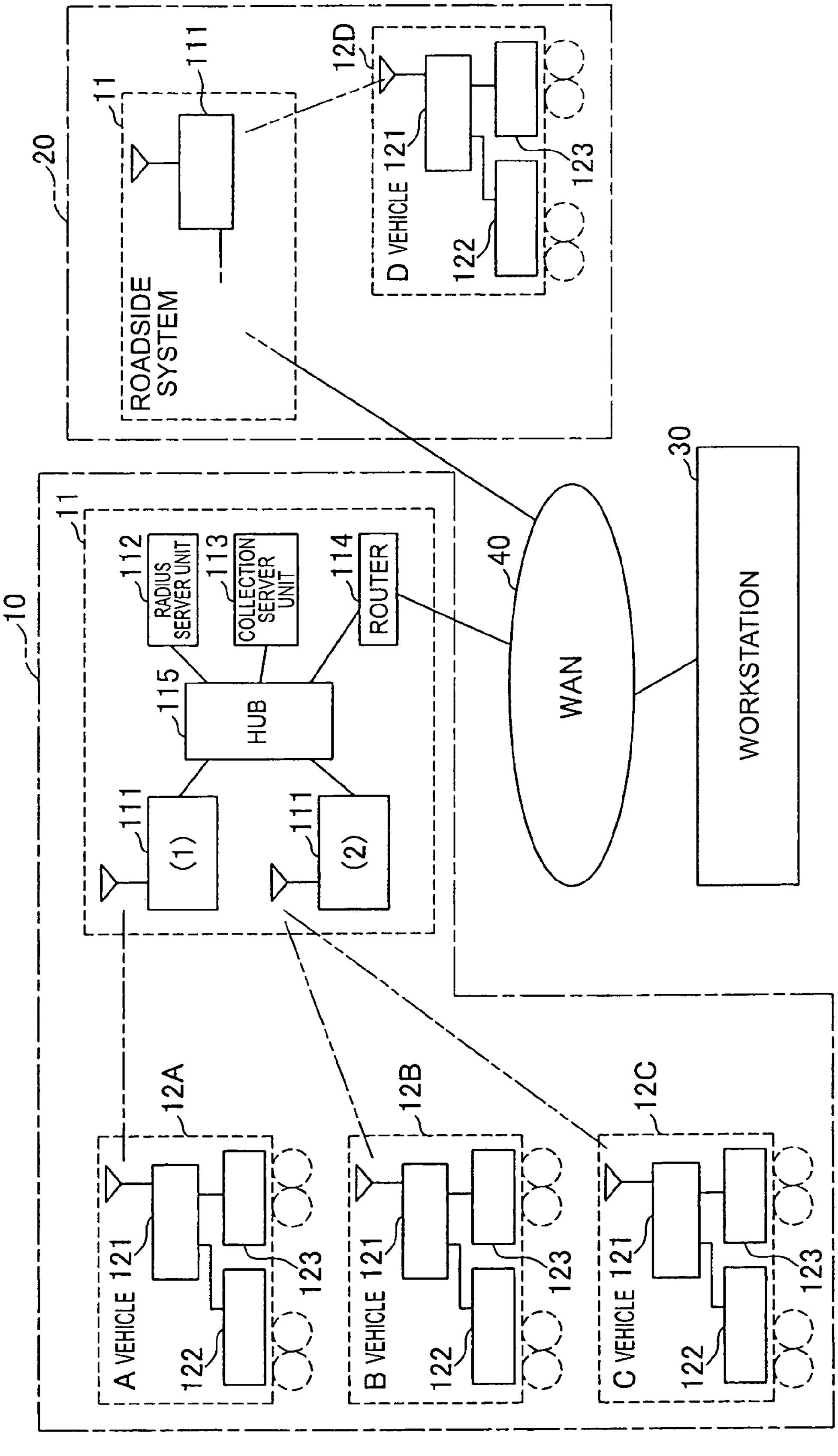
FIG. 1 is a block diagram showing a vehicle management system configured by connecting a data gathering system as an embodiment of a data gathering system for a mobile object according to the present invention to a workstation through a WAN.

An embodiment according to the present invention will now be described with reference to FIGS. 1 to 8. FIG. 1 is a view showing an outline configuration of a rail vehicle management system that manages rail vehicles by utilizing vehicle information concerning the rail vehicles collected by a data gathering system for rail vehicles as an embodiment of a data gathering system for a mobile object to which a method and a device for providing communication data according to the present invention are applied.

In FIG. 1, the rail vehicle management system includes a large-scale rail vehicle information gathering system 10 configured in, e.g., a large rail yard, a small-scale rail vehicle information gathering system 20 configured in a far place distanced from the rail yard, e.g., a vehicle detention space provided to be adjacent to a station building, a workstation 30 that performs administrative tasks of rail vehicles based on vehicle information collected by both the systems 10 and 20, and a wide area network (WAN) 40 that connects these members.

The large-scale rail vehicle information gathering system 10 and the small-scale rail vehicle information gathering system 20 have a difference in number of vehicles alone as vehicle information gathering targets but basically have the same configuration. Therefore, a system configuration of the large-scale rail vehicle information gathering system 10 will be explained as a representative of both the systems.

The system 10 includes a ground device 11 and on-vehicle devices 12A to 12C each of which is a device on a mobile object that is installed in each of rail vehicles A to C and connected with the ground device 11 through a wireless local area network (LAN). In this embodiment, a wireless LAN conforming to IEEE802.11x that performs mutual communication based on the Internet Protocol (IP) is adopted, and a static IP address for the mutual communication is preset to each of the ground device 11 and the on-vehicle devices 12A to 12C.

Figure 2:
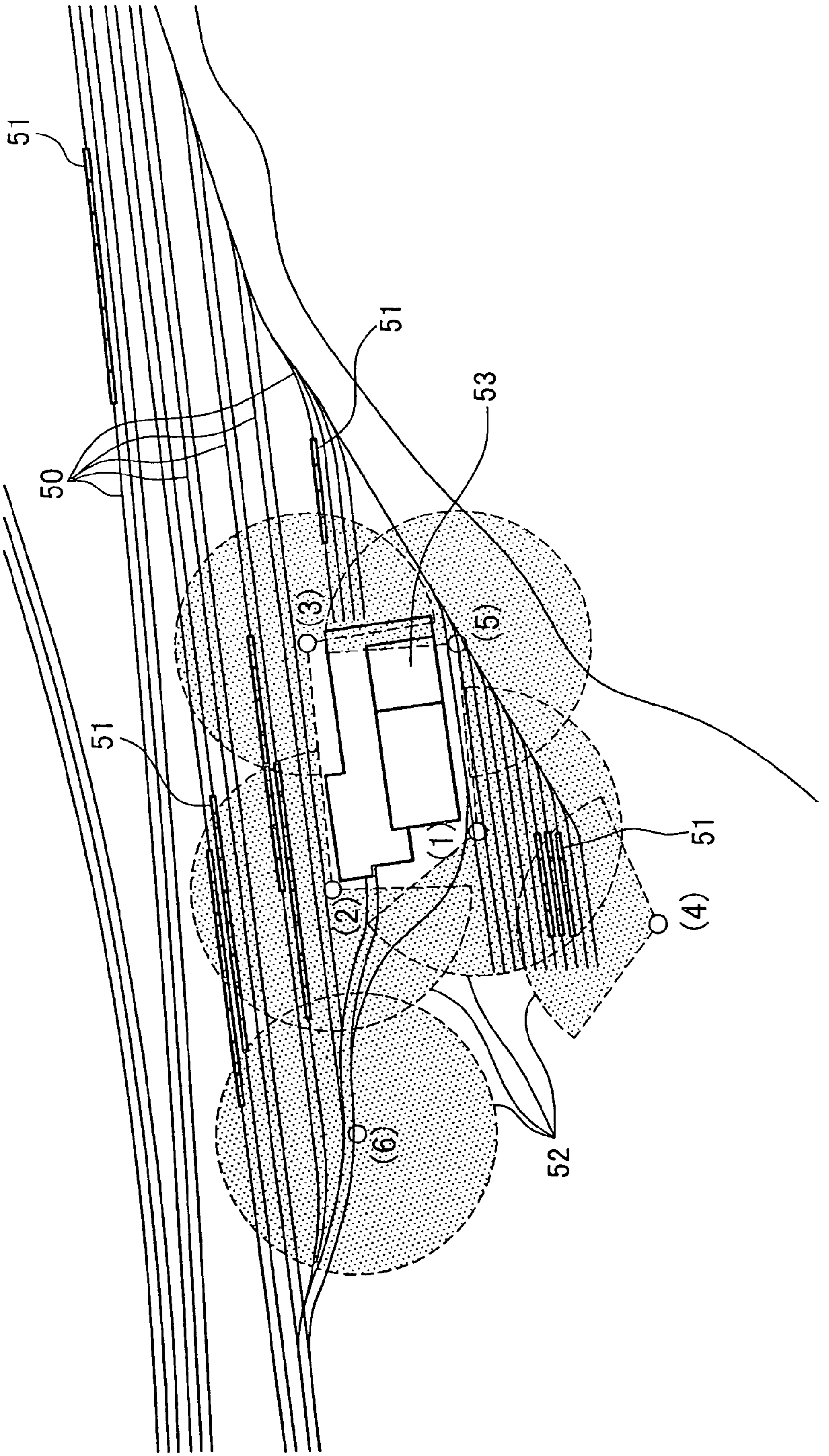
FIG. 2 is an explanatory view showing an example of a rail yard (a vehicle detention space) in which a ground device is installed.

The ground device 11 has a plurality of wireless communication units 111 installed as access points in the vehicle detention space in such a large rail yard as depicted in FIG. 2, an RADIUS authentication server unit 112 that authenticates access to an access point, a collection server unit 113 that collects and stores vehicle information, a router unit 114 that connects the ground device to the WAN, and a hub (HUB) 115 that connects these members to each other through a cable LAN. A global IP address is provided to the ground device 11 to be Internet-connected with the workstation 30 through the WAN 40 so that reference can be made to the vehicle information collected in the collection server unit 113 from the workstation 30 side for maintenance and management of vehicles.

FIG. 1 shows the two wireless communication units 111 of the ground device 11 only. However, in case of such a large rail yard as depicted in FIG. 2, six wireless communication units 111 (1) to (6) are installed so that wireless communication can be achieved between the on-vehicle devices 12 disposed in respective vehicles organized in a train no matter where in a rail siding 50 provided in the rail yard a train 51 is detained. One of a plurality of channels determined based on a standard to avoid mutual interference is selected and assigned to the wireless communication unit 111 at each access point so that communication can be achieved even though a communication enabled area 52 of an adjacent access point overlaps. It is to be noted that the RADIUS authentication server unit 112 and the collection server unit 113 excluding the wireless communication units 111 are disposed in a building 53 including a work area for performing a vehicle maintenance work or a staff room for drivers.

The RADIUS authentication server unit 112 is used as a scheme that unifies the management of authentication information in remote access. The RADIUS authentication server unit 112 previously stores data of user IDs and passwords allowing connection in order to effect authentication processing by using the user IDs and the passwords, and it collates the previously stored data with data of a user ID and a password supplied with a connection request upon receiving the connection request from each of the on-vehicle devices 12A to 12C, thereby allowing the connection in case of match.

The collection server unit 113 performs polling with respect to each of the on-vehicle devices 12A to 12C permitted to connect by the RADIUS authentication server unit 112, allows each of the on-vehicle devices 12A to 12C to transmit vehicle information stored therein, and collects the transmitted information.

All the on-vehicle devices 12A to 12C installed in respective rail vehicles A to C have the same configuration. Therefore, an outline configuration of the on-vehicle device 12A will be explained as a representative of all of these devices. As shown in FIG. 1, the on-vehicle device 12A has a wireless communication unit 121, a first vehicle information storage unit 122, and a second vehicle information storage unit 123.

When the rail vehicle enters one communication enabled area 52 of the plurality of wireless communication units 111 in the ground device 11 to be stopped at a predetermined detention position and travel of the vehicle is terminated by turning off an operation key, the wireless communication unit 121 starts wireless communication with one of the plurality of wireless communication units 111(1) to 111(2) installed as wireless LAN access points of the ground device 11. The first vehicle information storage unit 122 monitors operation states of various devices such as an air-conditioning equipment mounted in the vehicle, judges a monitored state to diagnose malfunction, failures or needs for maintenance of the devices, sequentially records diagnosis results with time, and stores first vehicle information concerning mounted devices. The second vehicle information storage unit 123 sequentially records an operational aspect from start to end of the operation, e.g., acceleration or deceleration of a motor that drives the vehicle or a use condition of a brake as time-series data, and stores second vehicle information concerning the vehicle. The vehicle information stored in each of the vehicle information storage units 122 and 123 is stored in a period after the train detained in the rail yard moves out from the rail yard and the operation key is turned on to start travel of the train until travel of the vehicle is terminated and the operation key is turned off to collect the stored vehicle information by the ground device 11.

With the above-described configuration, when the train that has returned to the rail yard enters one communication enabled area 52 of the plurality of wireless communication units 111 in the ground device 11 to be detained at the predetermined detention position and travel of the train is terminated by turning off the operation key, the wireless communication unit 121 of the device on a mobile object 12A performs mutual communication with the wireless communication unit 111 of the ground device 11 through the wireless LAN by using the Internet Protocol (IP) and adds authentication information to the collection server unit 113 in the ground device 11 to request connection. In the ground device 11 that has received the connection request, the RADIUS authentication server unit 112 carries out authentication based on the authentication information included in the connection request. When the on-vehicle device 12A that has requested the connection is authenticated as a legitimate device based on this authentication, the collection server unit 113 that has received this notification registers the on-vehicle device 12A in a polling target list and accesses the first and second vehicle information storage units 122 and 123 in the on-vehicle device 12A by polling to transmit vehicle information stored in these information storage units like the on-vehicle devices 12B to 12D installed in other registered vehicles. The vehicle information received by the wireless communication unit 111 in the ground device 11 is stored and collected in a non-illustrated database in the collection server unit 113.

Figure 3:
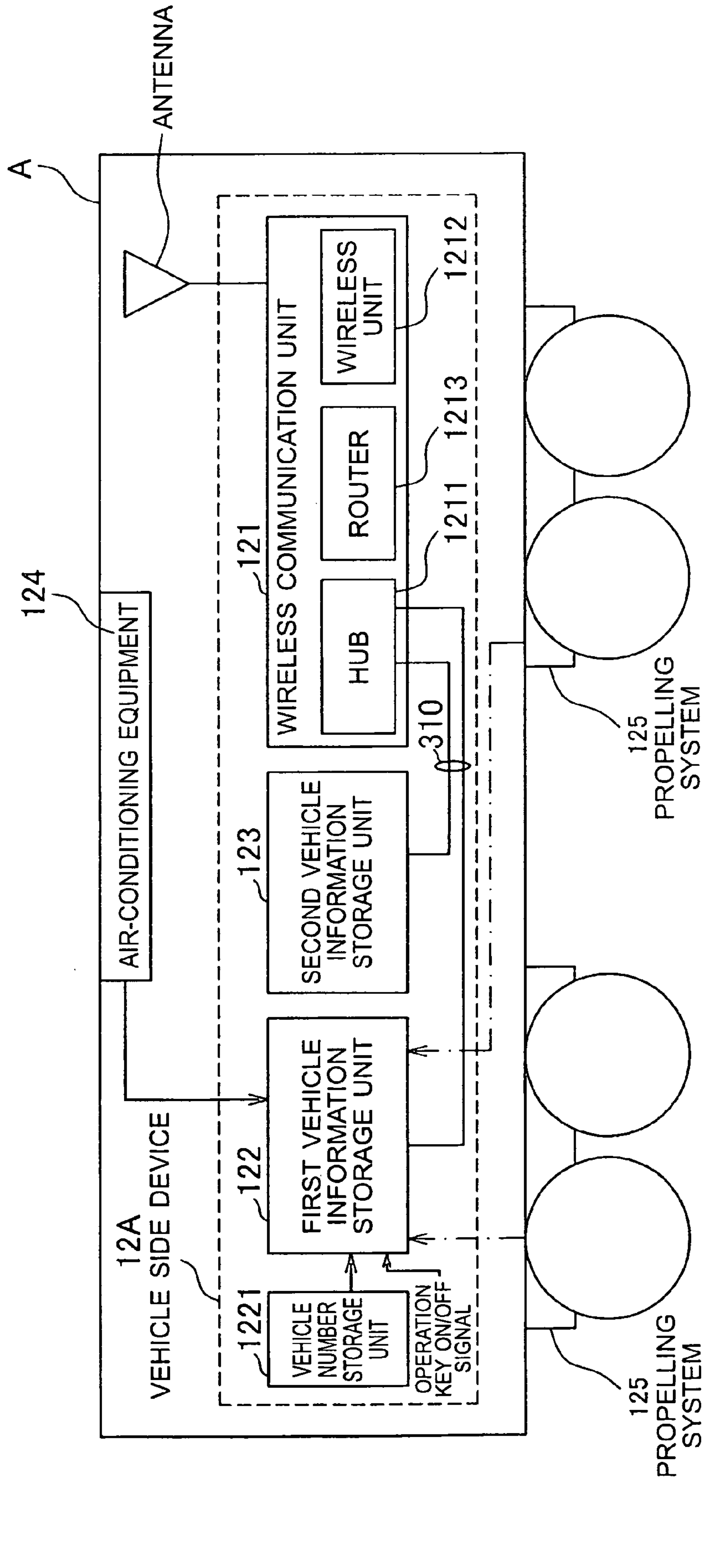
FIG. 3 is a block diagram showing an outline structural example of a vehicle-side device.
Figure 4:
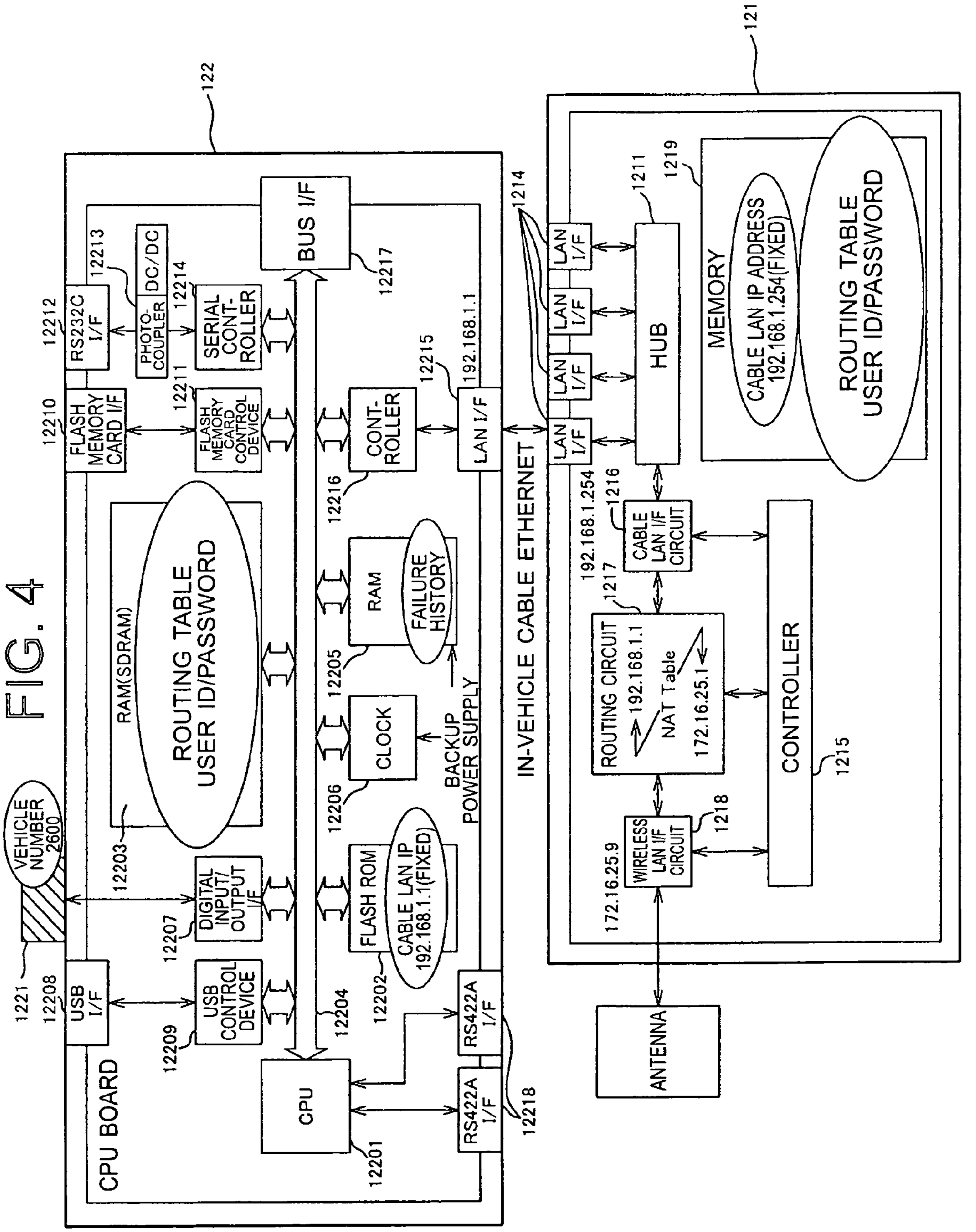
FIG. 4 is a block diagram showing a specific structural example of a main part of the vehicle-side device.

In the embodiment depicted in FIG. 1, although there is no description about IP addresses utilized when the wireless communication unit 121 in the on-vehicle device 12A and the wireless communication unit 111 in the ground device 11 perform mutual communication via the wireless LAN based on the Internet Protocol (IP), an embodiment that an IP address that should be provided to the on-vehicle device 12A itself is automatically generated and this automatically generated IP address is automatically set will now be explained hereinafter with reference to FIG. 3 showing an outline configuration and FIG. 4 showing a detailed configuration.

In FIG. 3, the on-vehicle device 12A is configured in such a manner that the wireless communication unit 121, the first vehicle information storage unit 122 and the second vehicle information storage unit 133 communicate with each other through a cable LAN when the first vehicle information storage unit 122 and the second vehicle information storage unit 123 are connected to a hub 1211 included in the wireless communication unit 121 through connectors.

The wireless communication unit 121 has a wireless unit 1212 that performs wireless communication with the ground device 11 and a router 1213 that effects address transformation of the wireless LAN and the cable LAN besides the hub 1211. The wireless communication unit 121 transmits data from itself or data received from the vehicle information storage unit 122 or 123 via the cable LAN as a wireless packet in the form of a wireless signal through the wireless unit 1212 from an antenna. Furthermore, it receives a wireless signal from the ground device 11 to take out data from a wireless packet and receives data by itself in accordance with an IP address of a destination or transmits data to the vehicle information storage unit 122 or 123 through the router 1213 by using the cable LAN. The router 1213 has a routing table required to perform address transformation between a static IP address for the cable LAN and a static IP address for the wireless LAN that consist of predetermined fixed values previously provided to each of the wireless communication unit 121, the first vehicle information storage unit 122 and the second vehicle information storage unit 123 in the on-vehicle device 12A, and it rewrites the IP addresses based on this routing table. A routing table setting operation for the router 1213 will be described later. This routing table has a function of a network address translation table (NAT) created by using a port number.

It is to be noted that the static IP address for the cable is used in the cable LAN alone in the vehicle and it is not used outside the vehicle, and hence the same static IP addresses for the cable are provided to the on-vehicle devices mounted on all the vehicles. However, since the static IP address for the wireless LAN is also received by the on-vehicle devices in other vehicles, a nonredundant static IP address for the wireless LAN must be provided to each of the on-vehicle devices installed in all vehicles. Moreover, nonredundant individual authentication information must be of course likewise provided to each on-vehicle device. Data required for wireless communication, e.g., the wireless LAN IP address and the individual authentication information is referred to as wireless communication data.

To store the first vehicle information, the first vehicle information storage unit 122 has recording means for receiving a signal indicative of a state of each of various device, e.g., an air-conditioning equipment 124 or a device 125 in a propelling system through a signal line, monitoring the received signal, judging an operating state of each of various devices based on the input signal under predetermined conditions to diagnose a failure of the device, and sequentially recording a failure history as the first vehicle information concerning the mounted device.

Moreover, the first vehicle information storage unit 122 has address generating means for generating a static IP address for the wireless LAN required to create the routing table set to the router 1213 in the wireless communication unit 121. Therefore, the first vehicle information storage unit 122 includes a vehicle number storage unit 1221 serving as a mobile object identification code storage unit previously storing a vehicle number as a mobile object identification code previously provided to enable identifying a vehicle in which the on-vehicle device 12A is installed, and it receives an on/off signal of the operation key of the train. When a power supply of the device on a mobile object is turned on, the first vehicle information storage unit 122 generates a static IP address for the wireless LAN, a user ID and a password for later-described authentication (RADIUS authentication) that are provided to each of the wireless communication unit 121, the first vehicle information storage unit 122 and the second vehicle information storage unit 123 in the on-vehicle device 12A based on the vehicle number input from the vehicle number storage unit 1221 in accordance with a predetermined rule, and provides them. Additionally, when the operation key is turned off to start wireless communication with the ground device, provision is again performed just in case.

Further, the first vehicle information storage unit 122 generates the routing table based on the generated static IP address for the wireless LAN and fixed values of the static IP addresses for the cable LAN previously provided to the first and second vehicle information storage units 122 and 123 and the wireless communication unit 121, respectively. The generated routing table is transmitted to the wireless communication unit 121 together with the static IP address for the wireless LAN, the user ID and the password of the wireless communication unit 121 to be utilized to configure a setting required for the on-vehicle device 12 to communicate with the ground device 11 in the wireless communication unit 121. It is to be noted that particulars of how to generate the static IP address for the wireless LAN based on the vehicle number will be explained later.

It is to be noted that the vehicle number storage unit 1221 is formed of, e.g., a mechanical thumbwheel switch, a DIP switch or a nonvolatile semiconductor memory which is mechanically attachable/detachable and from which a stored vehicle number can be electrically read. Furthermore, the vehicle number storage unit 1221 is not lost or not accidentally switched with a counterpart in another vehicle since it is fixed to a corresponding vehicle by, e.g., a chain even though it has been removed from the first vehicle information storage unit 122. This vehicle number identifies a vehicle that is not redundant in respective vehicles, and it is grasped as a mobile object identification code when the vehicle is grasped as a mobile object. Therefore, the vehicle number storage unit corresponds to a mobile object identification code storage unit.

A more specific configuration of the wireless communication unit 121 and the first vehicle information storage unit 122 in the on-vehicle device 12A will now be described with reference to FIG. 4. In FIG. 4, the second vehicle information storage unit 123 is omitted.

The wireless communication unit 121 has four LAN interfaces (I/F) 1214, and the first vehicle information storage unit 122 is connected to the hub 1211 through one of these interfaces. The wireless communication unit 121 also has a controller 1215 formed of, e.g., a one-chip microcomputer, a cable LAN interface (I/F) circuit 1216, a routing circuit 1217 and a wireless LAN interface (I/F) circuit 1218, and the routing circuit 1217 that is controlled by the controller 1215 to function as the router 1213 (FIG. 3) is connected with the hub 1211 through the cable LAN I/F circuit 1216 and with a wireless antenna through the wireless LAN I/F circuit 1218. The wireless communication unit 121 further has a memory 1219 to store a user ID and a password used for authentication.

The first vehicle information storage unit 122 has a central processing unit (CPU) 12201, a flash ROM 12202 as a nonvolatile memory storing a program and fixed data used for execution of the program and an SDRAM 12203 as a work memory utilized for execution of the program, and these members are connected with each other through a bus 12204 such as a PCI bus.

The bus 12204 is also connected with an RAM 12205 as a memory that functions as vehicle information storing means for sequentially storing second vehicle information such as a failure history and that is subjected to power supply backup to prevent the stored information from being lost due to a power supply shutdown, and a clock 1226 that is likewise subjected to power supply backup and generates actual time data.

Moreover, to the bus 12204 are connected a digital input/output I/F 12207 connected with the vehicle number storage unit 1221, a USB control device 12209 connected with a USB connection device through a USB I/F 12208, a flash memory card control device 12211 connected with a flash memory through a flash memory card I/F 12210, a serial controller 12214 connected with, e.g., a monitor device through an RS233C I/F 12212 and a photo-coupler 12213, an LAN controller 12216 that communicates with the wireless communication unit 121 through an LAN I/F 12215, and a bus I/F 12217 utilized to directly connect each device to the bus 12204. The flash memory card I/F 12210 can be used when the second vehicle information is taken into the flash memory card. The bus I/F 12217 can be directly coupled with the CPU 12201 to transmit/receive high-speed data.

Additionally, to the CPU 12201 are connected two RS422A I/Fs 12218 that input signals for monitoring operating states of various devices mounted in a vehicle to make a judgment under predetermined conditions and provide, e.g., an actual time that a clock is produced to acquire in time series the failure history.

The CPU 12201 in the first vehicle information storage unit 122 performs, e.g., setting processing for effecting a configuration setting for mutual communication between the on-vehicle device 12 and the ground device 11 besides vehicle information storage processing for judging signals from the RS422A I/F 122118 to sequentially store the second vehicle information in the RAM 12205. In the configuration setting, a static IP address for the wireless LAN, a routing table, a user ID and a password for the RADIUS authentication and others are set.

The flash ROM 12202 stores a judgment value utilized for a judgment in the vehicle information storage processing, various fixed values utilized in the setting processing, and address information besides programs required to execute the vehicle information storage processing, the setting processing and others. Specifically, as the fixed values, fixed values previously assigned to a static IP address on the cable LAN side, a subnet mask thereof and a subnet mask for the wireless LAN or any other preset fixed values utilized for routing or encryption are stored.

In this example, as the static IP addresses on the cable LAN side, 192.168.11 is assigned to the first vehicle information storage unit 122; 192.168.1.2 is assigned to the second vehicle information storage unit 123; 192.168.1.254 is assigned to the wireless communication unit 121; a fixed value of 24 bits is assigned to the subnet mask; and a fixed value of 16 bits is assigned to the subnet mask for the wireless LAN, and these values are stored in the flash ROM 12202.

As the address information, there is stored an arithmetic expression representing a relationship between a vehicle number previously provided to each of all vehicles in which the on-vehicle devices 12 are installed and the static IP address for the wireless LAN determined in association with each of the vehicle numbers based on a predetermined rule or a vehicle number-IP address correspondence table obtained by executing an arithmetic operation based on the arithmetic expression.

The arithmetic expression representing the relationship between each vehicle number and the static IP address for the wireless LAN is utilized to generate from the vehicle number as a nonredundant static IP address for the wireless LAN a class B private IP address that is assigned to each of the first vehicle information storage unit 122, the second vehicle information storage unit 123 and the wireless communication unit 121 in the device on a mobile object 12 mounted in the vehicle. A generated IP address of 32 bits is divided every eight bits to be represented as decimal numbers, i.e., aaa, bbb, ccc and ddd, a fixed value of 172 is assigned to aaa, a fixed value of 016 is assigned to bbb, and ccc and ddd are determined based on the following arithmetic expression.

*ccc*=a quotient of [("vehicle number"–" start number of vehicle number")÷25]+"start number to be provided"

*ddd*=[a remainder of ("vehicle number"÷25)×10]+1 (the first vehicle information storage unit 122)

=[a remainder of ("vehicle number"÷25)×10]+2 (the second vehicle information storage unit 123)

=[a remainder of ("vehicle number"÷25)×10]+9 (the wireless communication unit 121)

In the above-described expression, for example, 2000 is used as "start number of vehicle number", and 1 is used as "start number to be provided". Here, when the vehicle number is 2600, ccc is (2600–2000)/25+1=25 based on the arithmetic expression. In regard to ddd, since the vehicle number is 2600 and dividable by 25, a remainder is 0, values 1, 2 and 9 that differ depending on each device are added, and ddd=1, 2 and 9 is obtained. Therefore, 172.16.25.1, 172.16.25.2 and 172.16.25.9 are generated as the static IP addresses for the wireless LAN of the first vehicle information storage unit 122, the second vehicle information storage unit 123 and the wireless communication unit 121. According to this technique, ccc is 25 as a common value when the vehicle number falls with the range of 2600 to 2624.

A value of ddd increases by 10 like 0, 10 and 20 up to 240 with respect to the vehicle number falling within the range of 2600 to 2624, and hence the IP address is not redundant even if ccc has the common value.

According to the above-described method, since values given by ccc or ddd fall within the range of 0 to 255, 25 is chosen as a divisor, but any other value may be used so as to avoid redundancy.

Further, a table in which 65536 values that represent ccc and ddd and are determined by 16 bits are associated with each vehicle number may be previously created and prepared as data generation information substituting for data generation information consisting of the fixed values of aaa and bbb and the arithmetic expression, this table may be stored as a correspondence table, and an IP address associated with each vehicle number may be selected and generated as an IP address of the on-vehicle device installed in this vehicle. That is, selection of an IP address associated with a vehicle number in the correspondence table is generation of an IP address associated with a vehicle number.

Since low-order 16 bits are calculated based on a vehicle number that necessarily differs depending on each vehicle as described above, generated IP address do not overlap. Furthermore, the fixed value of 016 is used for the bbb portion, but an arbitrary value falling within the range of 16 to 31 allowed as the class B may be used.

Since an IP address used in association with a vehicle number in the on-vehicle device installed in each vehicle is also already known in the ground device, a vehicle number of the vehicle having this IP address and the on-vehicle device installed in the vehicle can be specified in the ground device from a transmission source address of wireless data supplied to the ground device side. That is, in the ground device and the on-vehicle device, when the data generation information in which an IP address is mapped from a vehicle number is shared, one of the IP address and the vehicle number becomes known, thereby assuredly estimating the corresponding other.

It is to be noted that the static IP address for the wireless LAN generated as described above is combined with the static IP address for the cable LAN consisting of a fixed value to be used for generation of the routing table. In the on-vehicle device installed in the vehicle having the vehicle number 2600, such a routing table as depicted in FIG. 5 is generated to be stored in the RAM 12203.

A user ID and a password used for RADIUS authentication are also automatically generated based on each vehicle number. For example, the user ID is generated as "fixed user name"+"vehicle number"+"domain name", and wpa2600xyd is generated as the user ID of the on-vehicle device installed in the vehicle having the vehicle number 2600 if "fixed user name" is "wpa" and "domain name" is "xyd". The password can be generated by encrypting the vehicle number based on a predetermined method. When a correspondence relationship concerning the generation of the user ID and the password is shared by the ground device and the device on a mobile object, management of vehicles can be facilitated. That is, when the ground device has the data generation information, making reference to the data generation information based on the IP address enables specifying a vehicle number of a vehicle to which collected vehicle information belongs even if a vehicle number is not added to the vehicle information transmitted by the on-vehicle device in response to a request from the ground device.

The generated user ID and password are stored together with the routing table and others in the RAM 12203 in the first vehicle information storage unit 122, and then transmitted together with the routing table and others to the wireless communication unit 121 through the cable LAN to be stored in the memory 1219 for the configuration setting for the wireless LAN in the wireless communication unit 121.

Figure 6:
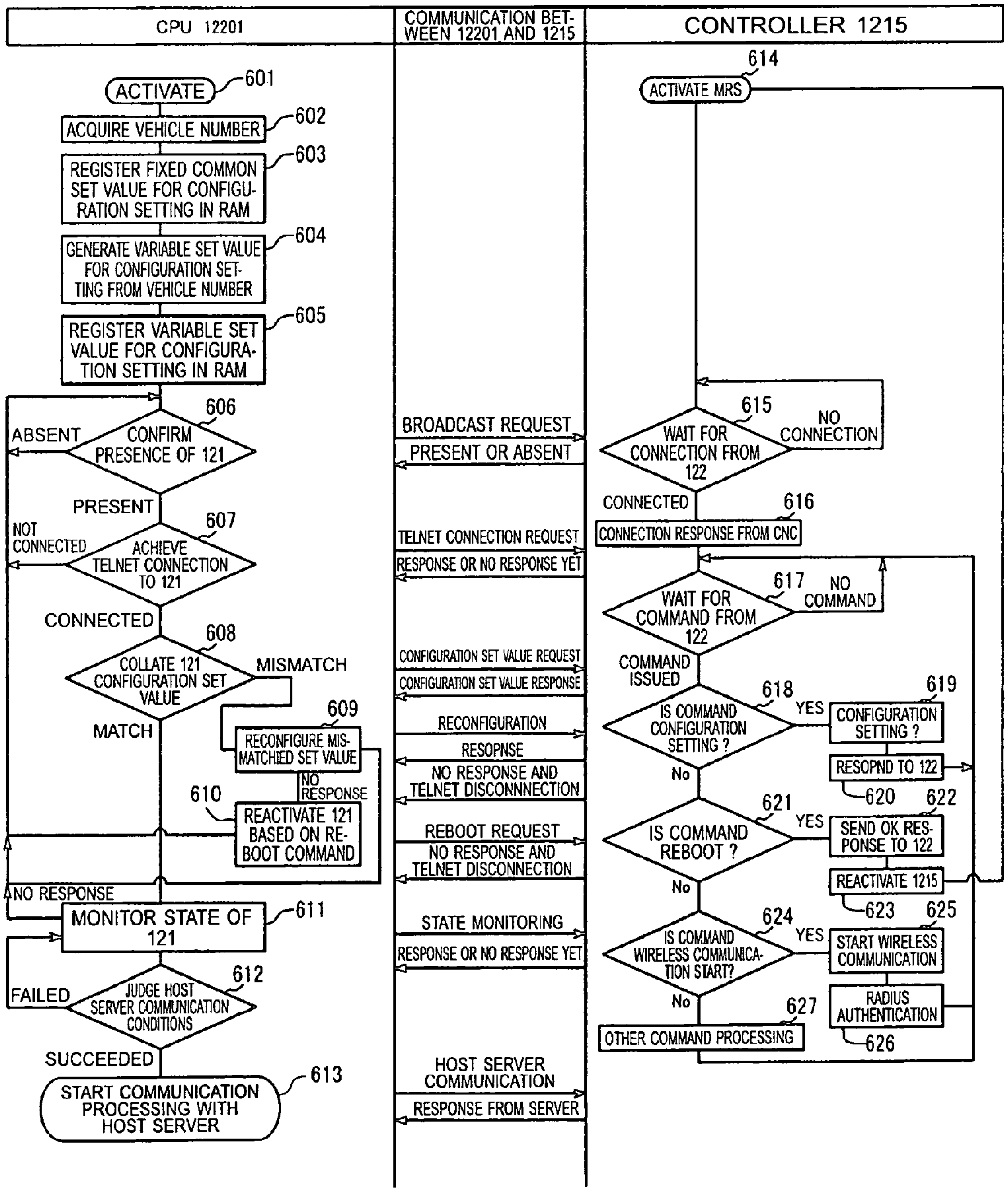
FIG. 6 is a flowchart showing processing executed by a CPU 12201 and a control unit 1215 in FIG. 4.
Figure 8:
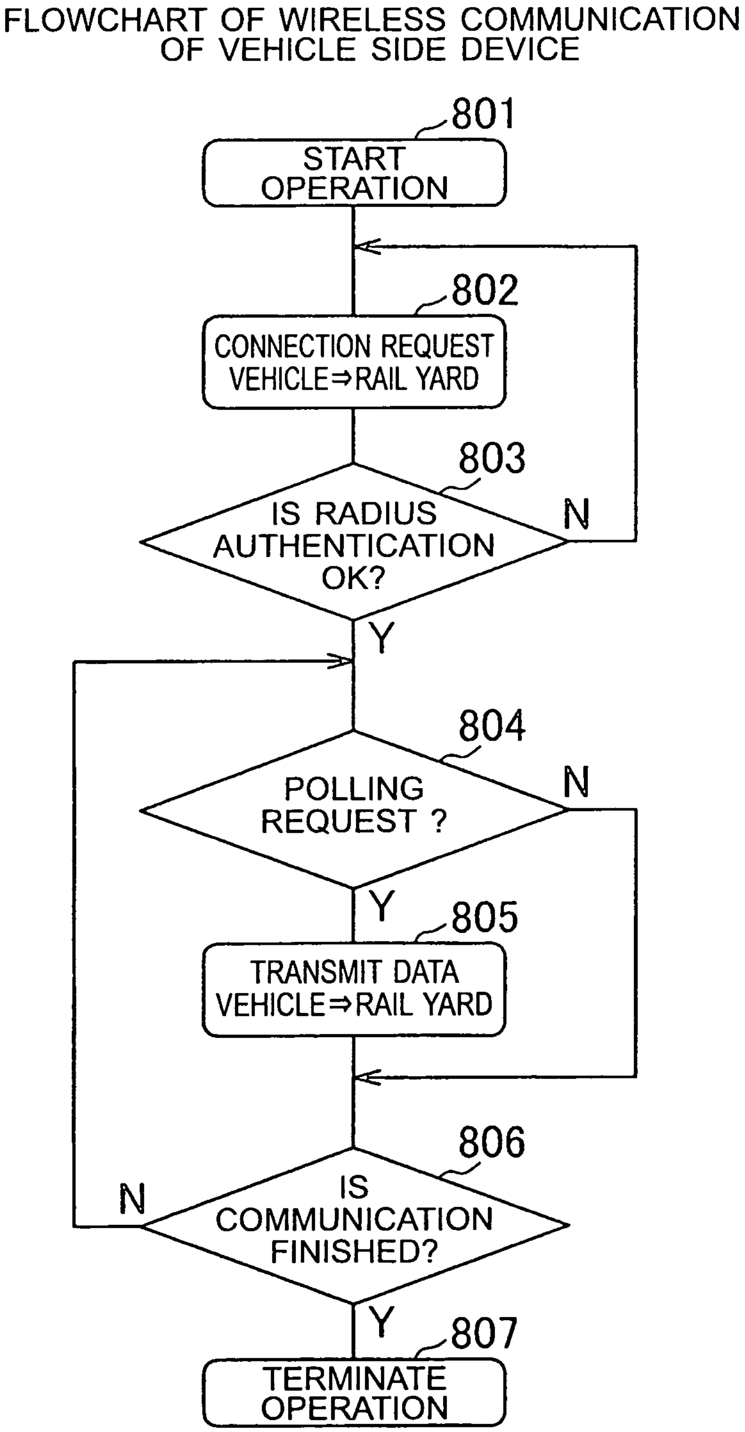
FIG. 8 is a flowchart showing a wireless communication operation of the vehicle-side device.

The detail of an operation of the vehicle information gathering system roughly explained above will now be described hereinafter with reference to FIG. 6 showing a flowchart indicating processing executed by each of the CPU 12201 of the first vehicle information storage unit 122 and the controller 1215 of the wireless communication unit 121 and mutual communication statuses, FIG. 7 showing flowcharts of processing executed by the collection server unit of the ground device, and FIG. 8 showing a flowchart indicating processing of wireless communication placed on the mobile object side.

First, in FIG. 6, when a power supply of the first vehicle information storage unit 122 is turned on, the CPU 12201 of the first vehicle information storage unit 122 starts a series of operations (a step 601). On the other hand, the controller 1215 has entered an activated state by turning on a power supply of the controller.

When the CPU 12201 of the first vehicle information storage unit 122 is activated, it first acquires a vehicle number inherent to a vehicle in which the on-vehicle device 12 is installed from the vehicle number storage unit 1221 through the digital I/F 12207 (a step 602).

Then, a configuration setting fixed value stored in the flash memory ROM 12202 is read out, and it is written into a predetermined area in the RAM 12203 functioning as a working memory and then registered (a step 603). As the configuration setting fixed value, there is a value of the subnet mask required to interpret a cable LAN IP address, a value of the subnet mask required to interpret a wireless LAN IP address, a routing method for achieving communication with the ground device from each device on a mobile object through the wireless LAN, or an encryption key required for the wireless communication, and they are all values common to all the on-vehicle devices.

Additionally, a wireless LAN static IP address, a user ID and a password of the device on a mobile object installed in the vehicle are generated by the method based on the vehicle number acquired from the vehicle number storage unit 1221 (a step 604), and they are written into a predetermined area in the RAM 12203 serving as the working memory and then registered for the configuration setting (a step 605).

Thereafter, since the preparation for communication is completed, the CPU 12201 supplies an operation of confirming an activated state of the wireless communication unit 121 to all members in the device 12 by using broadcast data in the cable LAN and waits for a response from the wireless communication unit 121 to start communication with the wireless communication unit 121 (a step 606). When the wireless communication unit 121 has been activated and presence of the wireless communication unit 121 is confirmed by supplying the response, Telnet connection with respect to the wireless communication unit 121 is tried by using the cable LAN static IP address (a step 607).

The CPU 12201 uses the Telnet to inquire about a wireless LAN configuration setting value already registered in the memory 1219 in the wireless communication unit 121 and checks match/mismatch with respect to the wireless LAN setting value newly registered in the RAM 12203 (a step 608). In case of mismatch, a value required for an operation of the routing circuit in the wireless communication unit 121 is reconfigured in regard to the mismatched setting value (a step 609).

Here, when reconfiguring is effected and a response informing end of setting is obtained from the wireless communication unit 121, the Telnet is disconnected, and the processing returns to the operation of confirming presence of the wireless communication unit 121 (the step 606). In this case, since the set value of the wireless communication unit 121 is a value registered in the RAM 12203, the set values coincide in an inquiry with respect to the next wireless communication unit 121 (the step 608).

Here, when the set value is supplied and a response from the wireless communication unit 121 cannot be obtained, the Telnet connection is disconnected, and a reactivation command is supplied to the wireless communication unit 121 (reboot) to reactivate the wireless communication unit 121.

When the operation of setting the new set value with respect to the wireless communication unit 121 is successful as described above, it is determined that the setting values coincide with each other at the step 608, and the processing advances to state monitoring processing (a step 611). In this state monitoring processing, when the wireless communication unit 121 is also a monitoring target and no response is returned with respect to state monitoring, the processing returns to the step 606 to repeat the above-described operation, and whether the set value of the wireless communication unit 121 matches with a value registered in the RAM 2203 is confirmed, and reactivation processing is carried out when these values do not match with each other.

In the state monitoring processing (the step 611), a signal indicative of a state of each of various devices mounted in the vehicle is input, the state is monitored based on an input value, a monitoring result is judged under predetermined conditions to diagnose a failure and others, and a failure history is sequentially stored and accumulated in the RAM 12205.

At the step of the state monitoring processing (the step 611), communication conditions between the on-vehicle device 12 and the ground device 11 are judged based on a state of the operation key (a step 612). When the operation key is turned off, it is determined that communication start conditions are achieved, and the wireless communication unit 121 is instructed to start wireless communication with the ground device 11. At this time, data required for the wireless communication, i.e., wireless communication data, e.g., a wireless communication IP address, a routing table, authentication information and others are again set. When the wireless communication unit starts communication with the ground device and later-described authentication from the ground device 11 can be obtained, communication processing for transmitting vehicle information to the collection server unit 113 as a host server is executed (a step 613). Contents of the communication processing will be described later.

A processing operation performed by the controller 1215 of the wireless communication unit 121 will now be described likewise with reference to a flowchart depicted in FIG. 6.

When the power supply is turned on, the controller 1215 is activated (a step 614) and enters a connection standby mode based on the Telnet from the first vehicle information storage unit 122 (a step 615). When the first vehicle information storage unit 122 issues a connection request, a response is returned (a step 616). When the wireless communication unit 121 returns the response, the first vehicle information storage unit 122 and the wireless communication unit 121 enter a communication state, and the wireless communication unit 121 waits for an instruction (a command) from the first vehicle information storage unit 122 (a step 617).

Upon receiving the instruction from the first vehicle information storage unit 122, contents of the instruction are judged (a step 618). When the instruction is a setting request, a configuration setting of a value in the memory 1219 of the wireless communication unit 121 is formed based on the wireless communication data supplied and provided from the first vehicle information storage unit 122 (a step 619). Therefore, based on this processing, the CPU 12201 of the first vehicle information storage unit 122 functions as wireless communication data providing means, it provides to the wireless communication unit of the on-vehicle device the wireless communication that is generated based on the arithmetic expression as prepared data generation information indicative of the wireless communication data predetermined in association with the vehicle number as the mobile object identification code previously provided to the vehicle in which the on-vehicle device is installed to enable identifying the vehicle and the vehicle number of the vehicle in which the on-vehicle device to which the wireless communication data should be set is installed and that should be set to the wireless communication unit of the device on a mobile object. Further, when the configuration setting operation is finished, a response indicative of end of the setting operation is returned to the first vehicle information storage unit 122 (a step 620).

Furthermore, when the instruction from the first vehicle information storage unit 122 is judged (a step 621) and the instruction is determined to be a reboot command, a response “OK” is returned to the first vehicle information storage unit 122 (a step 622), and the controller 1215 of the wireless communication unit 121 is reactivated (a step 623).

Moreover, when the instruction is judged (a step 624) and the instruction is start of wireless communication, a connection request is issued to the ground device 11 to start the later-described wireless communication with the ground device 11 (a step 625). In more detail, the wireless communication unit of the on-vehicle device detects an electric wave called “beacon” that is output from the ground device at fixed intervals, and checks a frequency of this wave, and tries communication with the wireless unit of the ground device by using this frequency and a preset extended service set identifier (which will be referred to as “ESS-ID” hereinafter), and the connection is completed on a physical layer level if the ground device has the same ESS-ID. At this time, a physical layer header including two points, i.e., ESS-ID and a communication rate is added to data and adjustment is performed so that the physical layer header can be utilized to effect optimum communication. Subsequently, the wireless communication unit of the device on a mobile object tries communication on a Mac layer (which will be referred to as an “MAC layer” hereinafter) level. At this time, an MAC address of the wireless unit of the ground device as a communication target is specified to avoid cross talk with wireless units other than the communication target. As described above, as to the communication with the ground device, later-described RADIUS authentication is performed as a security measure after achieving the basic communication with the ground device 11 (a step 626).

Additionally, although the detail of command processing (a step 627) other the above will be omitted, the wireless communication unit 121 executes an instruction supplied from the first vehicle information storage unit 122 through a cable network.

Data exchange between the ground device and the on-vehicle device will now be explained with reference to FIGS. 7 and 8. As shown in FIG. 7(A), the collection server unit 113 of the ground device 11 starts an operation when the power supply is turned on, and it sequentially performs communication processing with the device on a mobile object 12 through the wireless LAN (a step 71), polling processing of the on-vehicle device 12 through the wireless LAN (a step 72) and communication processing with the workstation 30 via the WAN (a step 73).

On the other hand, in the on-vehicle device, when the train returns to the rail yard and the operation key is turned off, start of wireless connection from the first vehicle information storage unit 122 of the device on a mobile object 12 installed in the vehicle to the ground device 11 is instructed. In response to this instruction, the wireless communication unit 121 of the on-vehicle device starts an operation as shown in FIG. 8 (a step 801). After connection in the physical layer and the MAC layer, a transmission source is determined as a wireless LAN static IP address of the wireless communication unit 121 to perform transmission, thereby achieving basic communication. Thereafter, a user ID and a user password are encrypted for authentication, and data required to acquire the RADIUS authentication from the RADIUS server unit 112 on the ground side is transmitted (a step 802).

Therefore, as shown in FIG. 7(B), accepting the connection request and the RADIUS authentication request (a step 711 and a step 712), the collection server unit 113 of the ground device 11 acquires the RADIUS authentication in the RADIUS server unit 112 (a step 713). The RADIUS server unit 112 has a contrastive table of the wireless LAN static IP address and a user ID and a password associated therewith for the wireless communication unit 121 of the device on a mobile object 12 that can perform communication, and this contrastive table is utilized to judge whether the wireless communication unit 121 of the on-vehicle device 12 as the transmission source is qualified to effect communication.

When the authentication has been successfully acquired from the RADIUS server unit 112 (OK), a message indicative of this success is transmitted to the device on a mobile object 12 (a step 714), and then the authenticated vehicle is registered in a polling list based on the wireless LAN static IP address of the wireless communication unit 121 as the transmission source (a step 715). When the authentication cannot be acquired (NO), information indicating that the RADIUS authentication is NO is transmitted from the ground device 11 to the device on a mobile object 12 (a step 717) to authenticate the number of times of specification (a step 716). The RADIUS authentication can prevent information collected in the database from being disrupted due to unauthorized invasion to the system.

In polling processing depicted in FIG. 7(C), when the polling list has target vehicles (a step 721), one of the target vehicles is selected to perform polling (a step 722). At this time, since the ground device 11 knows wireless LAN static IP addresses of the first vehicle information storage unit 122 and the second vehicle information storage unit 123 associated with the vehicle, the device on a mobile object installed in each vehicle in the device on the yard side is identified.

Therefore, the IP address is determined as a transmission destination to perform polling (a step 723). The on-vehicle device that has received polling from the ground device judges whether a polling request has been issued to itself (a step 804), and it transmits predetermined data or requested data to the ground device in case of polling for itself (a step 805). Vehicle information transmitted from the first vehicle information storage unit 122 and the second vehicle information storage unit 123 based on this polling is stored and collected in the database of the collection server unit 113 (a step 724). Upon completing collection from the on-vehicle device 12 that has performed polling, this vehicle is eliminated from the polling list (a step 725). This polling processing is repeated until there is no target vehicle in the polling list. The vehicle information collected in the database of the collection server unit 113 is utilized by the workstation 30 for vehicle management based on communication processing through the WAN (a step 73). Additionally, upon confirming transmission of all the stored vehicle information to the ground device, an instruction is issued from the ground device or the on-vehicle device determines end of communication itself (a step 806) and end conditions are met, and then the on-vehicle device stops the communication operation (a step 807).

Although the wireless communication unit 121, the first vehicle information storage unit 122 and the second vehicle information storage unit 123 are connected through the cable LAN and the means for providing wireless communication data such as a wireless LAN static IP address or a routing table to the first vehicle information storage unit 122 is provided in the on-vehicle device 12 in the foregoing embodiment, these members may be integrated. In this case, it is good enough for the means for providing the wireless communication data to provide an IP address of the on-vehicle device 12, and the routing table does not have to be provided. However, when the wireless communication unit 121 is separated from other units and provided through the cable LAN like the embodiment, an inexpensively available existing wireless communication unit can be utilized to enable configuring the on-vehicle device at a low cost, which is advantageous.

Further, the means that is provided in the on-vehicle device 12 and provides a wireless LAN static IP address may be provided in either the ground device 11 or the on-vehicle device 12 as the system. When this means is provided in the ground device 11, the ground device 11 can allow the on-vehicle device to sequentially transmit vehicle numbers and receive the vehicle numbers, and wireless communication data that is generated based on each received vehicle number and prepared data generation information indicative of wireless communication data such as an IP address previously provided to the vehicle and predetermined in association with the vehicle to enable identifying the vehicle can be wirelessly transmitted and provided to the on-vehicle device 12 or its wireless communication unit 121. However, when the generating and providing means is provided to the on-vehicle device 12 or the wireless communication unit 121, communication does not have to be performed between the on-vehicle device 12 and the ground device 11 for setting an IP address every time a wireless LAN static IP address is generated and provided, and a burden on the ground device 11 that must collect vehicle information can be reduced.

Furthermore, even when the wireless communication data providing means is provided on the on-vehicle device 12 side, it may be provided to be connected to the wireless communication unit 121 together with the first vehicle information storage unit 122 and the second vehicle information storage unit 123 through the hub rather than being provided in the first vehicle information storage unit 122. However, when the wireless communication data providing means is provided to the vehicle information storage unit 122, the configuration of the on-vehicle device 12 can be simplified.

Moreover, in the foregoing embodiment, the system includes the vehicle number storage unit 1221 storing each vehicle number previously provided to the vehicle having the on-vehicle device 12 installed therein to enable identifying the vehicle and the wireless communication data generating means for generating wireless communication data based on each vehicle number stored in this vehicle number storage unit 1221 and prepared data generation information such as tables or arithmetic expressions indicative of wireless communication data predetermined in association with the vehicle number, the wireless communication data providing means can provide the wireless communication data based on the wireless communication data generated by the wireless communication data generating means, and the wireless communication data does not have to be provided by manual input.

However, the system may include detachable wireless communication data storing means having a nonvolatile memory such as a flash memory or an ROM storing wireless communication data that is generated based on prepared data generation information indicative of wireless communication data preset to the vehicle in which the on-vehicle device 12 is installed in association with a vehicle number previously provided to enable identifying the vehicle and the vehicle number of the vehicle in which the on-vehicle device 12 to which the wireless communication data should be set is installed and that should be set to the device on a mobile object 12.

In this case, the wireless communication data can be stored in the wireless communication data storing means by, e.g., inputting a vehicle number to a personal computer having data generation information in advance by a key operation, generating wireless communication data associated with the vehicle number based on the input vehicle number and the data generation information, and writing the generated wireless communication data in the detachable wireless communication data storing means. When a label having the vehicle number associated with the stored wireless communication data printed thereon is attached to a package of the wireless communication data storing means having the wireless communication data written therein, the wireless communication data storing means can be detachably disposed to the device on a mobile object that is installed in the vehicle having the vehicle number printed on the label without errors. Moreover, when the wireless communication data stored in the wireless communication data storing means is read out, the wireless communication data providing means can provide the wireless communication data to the device on a mobile object or the wireless communication unit, and the wireless communication data does not have to be input by a manual operation.

However, when the wireless communication data generating means is provided like the illustrated embodiment, preparing the vehicle number storage unit 1221 storing each previously provided vehicle number can suffice, and the trouble of preparing the wireless communication data storing means storing the wireless communication data in advance can be eliminated.

Additionally, although the data generation information is an arithmetic expression required to calculate and generate based on a mobile object identification code wireless communication data such as a wireless communication IP address, a routing table or authentication information (a user ID and a password) predetermined in association with each vehicle number in the foregoing embodiment, it may be a correspondence table of the wireless communication data calculated based on this arithmetic expression and each vehicle number or a correspondence table of each vehicle number and arbitrary wireless communication data previously created in association with the vehicle number without using the arithmetic expression so as to avoid redundancy. However, when the arithmetic expression is used, an operation of changing the correspondence table for adding a vehicle number and wireless communication data associated therewith is not required even if the system configuration is changed to add a vehicle in which the device on a mobile object is mounted, which is advantageous in omitting the number of steps in the system operation.

Further, although the mobile object is a vehicle that travels on a track in the foregoing embodiment, it may be a business-oriented vehicle such as a truck or a bus other than a rail car. In any case, the ground device 11 must be installed to be capable of communicating with the device on a mobile object that is installed on the mobile object.

Furthermore, although the information storage unit is formed to be divided into the first and second information storage units in the foregoing embodiment, both units may be integrally formed. However, when storing vehicle information including a diagnosis result and vehicle information including an operation state like this embodiment, classifying vehicle information to be collected depending on each type in advance is convenient at the time of utilization.

Moreover, although the communication protocol is the Internet Protocol in the foregoing embodiment, it may be an arbitrary protocol. However, in the present circumstances, the Internet protocol is most widely used as a communication protocol, and adopting the Internet Protocol is preferable to form the wireless communication unit that performs protocol processing using a general-purpose product.

Additionally, although the vehicle number storing means is detachably disposed to the information storage unit and has the thumbwheel switch that can set numeric figures or characters that can be electrically read out in the foregoing embodiment, the vehicle number storing means may be a nonvolatile memory such as a flash memory or an ROM. However, when the thumbwheel switch is adopted, a writing unit that is utilized to write a vehicle number in the memory is no longer required, and hence a writing unit that is used for writing a vehicle number in the memory alone does not have to be prepared, which is convenient.

Further, although the device on a mobile object 12 or the wireless communication unit 121 uses wireless communication data set to itself to perform wireless communication with the ground device 11 every time the communication with the ground device is possible and the operation key of the vehicle is turned off in the foregoing embodiment, entering a communication area of the ground device 11 may be detected based on an electric wave intensity to start wireless communication. However, when wireless communication is carried out by turning off the operation key, wireless communication can be effected in response to end of vehicle travel and stop of the vehicle, which is preferable as a timing for collecting vehicle information based on wireless communication.

Furthermore, although the wireless communication data providing means performs the operation of providing wireless communication data before starting wireless communication every time communication with the ground device 11 is possible and the operation key of the vehicle is turned off in the foregoing embodiment, it may carry out the operation any time before starting wireless communication. However, in case of starting wireless communication every time the operation key of the vehicle is turned off, providing wireless communication data immediately before this start enables assuredly setting the wireless communication data required for wireless communication.

Moreover, although the method and the device for providing communication data are applied to the data gathering system for a mobile object in the foregoing embodiment, it can be applied to a network system for organizing vehicles in which on-vehicle devices installed in respective vehicles in a vehicle unit including a plurality of vehicles traveling on a track are connected with each other. In this case, communication data required to identify each on-vehicle device and effect communication between the on-vehicle devices in accordance with a predetermined communication protocol through a vehicle unit LAN is set, and the on-vehicle devices are connected with each other through the vehicle unit LAN based on communication using the set communication data.

Figure 9:
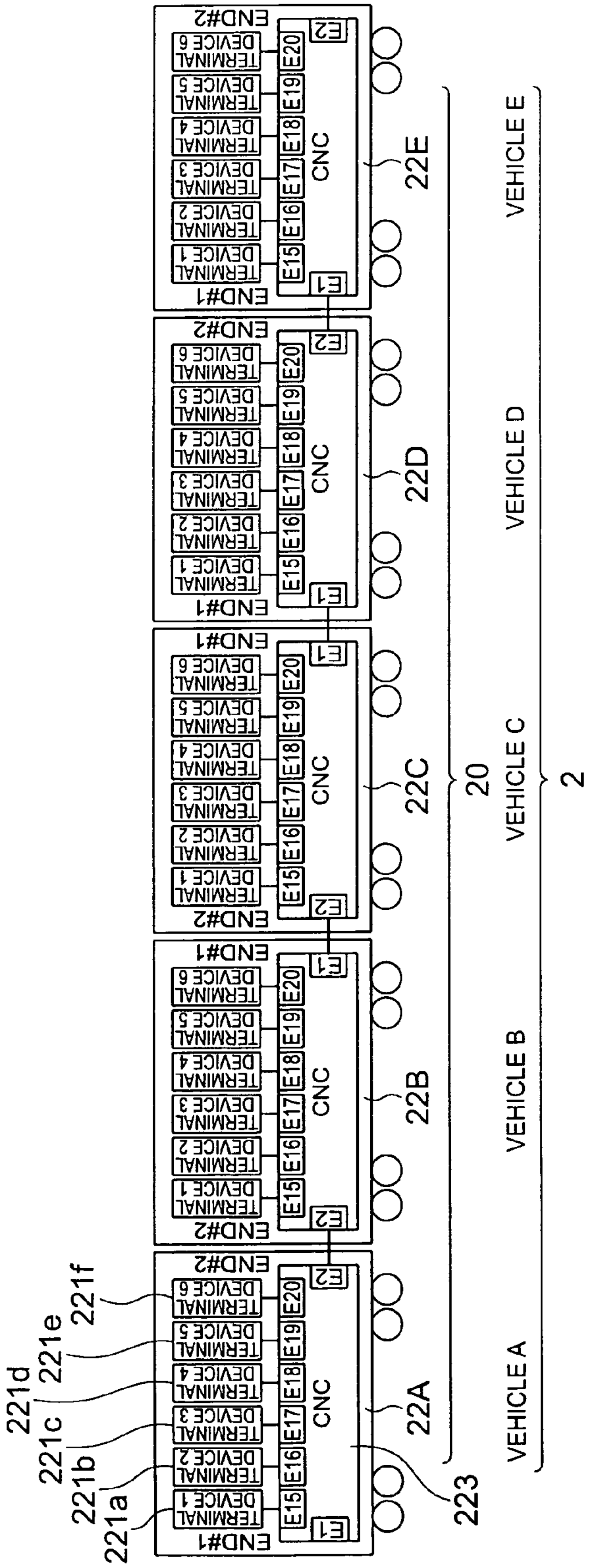
FIG. 9 is a view showing an outline configuration of a network system for organizing rail vehicles as an embodiment of a network system for organizing vehicles to which a method and a device for providing communication data according to the present invention is applied.

FIG. 9 is a view showing an outline configuration of a rail vehicle organizing network system as an embodiment of a network system for organizing vehicles to which the method and the device for providing communication data according to the present invention are applied. In the drawing, a rail vehicle organizing network system 20 is constituted of on-vehicle devices 22A to 22E each of which is installed in each vehicle in a vehicle unit 2 including a plurality of vehicles A to E traveling on a track and is connected with the others through a vehicle unit LAN. Vehicle unit LAN communication data including a vehicle unit LAN static IP address required to effect mutual identification and communication in accordance with a communication protocol, e.g., the Internet Protocol (IP) predetermined between the on-vehicle devices through the vehicle unit LAN is set to each of the on-vehicle devices 22A to 22E. The on-vehicle devices 22A to 22E are connected with each other based on communication through the vehicle unit LAN using the set communication data.

Each of the on-vehicle devices 22A to 22E installed in the respective vehicles A to E has a plurality of terminal devices 221*a* to 221*f* that are installed in each vehicle and include a door controller, a monitoring camera, a motor, an air-conditioning equipment, a braking device, an illumination device and others, and a network control device 223*a* connected with these devices. The network control device 223 includes as communicating means Ethernet (a registered trademark) interfaces (which will be referred to as LAN ports hereinafter) E1 and E2 that are connected through an LAN cable L with the network control device 223*a* in each of the on-vehicle devices 22A to 22E installed in a neighboring vehicle when both end portions of each vehicle are called a first end portion END#1 and a second end portion END#2 in advance to identify both the end portions of the vehicle and there are vehicles coupled with these end portions. The network control device 223 also includes as communicating means LAN ports E15 to E20 connected the plurality of terminal devices 221*a* to 221*f* through the LAN cable.

The network control device 223 has the LAN port E1 and E2 connected with the network control device of the on-vehicle device in a neighboring vehicle through the LAN cable L, and this network control device 223, the network control devices 223 installed in the other vehicles in the vehicle unit 2 and the plurality of terminal devices 221*a* to 221*f* installed in all the vehicles constitute a vehicle unit LAN system that performs communication by using an IP address based on the IP. To perform communication through the vehicle unit LAN, vehicle unit LAN IP addresses are set to the network control devices 223 and the plurality of terminal devices 221*a* to 221*f* in all the vehicles. The network control device 223 communicates with the plurality of terminal devices 221*a* to 221*f* in its own vehicle and the network control devices 223 and the plurality of terminal devices 221*a* to 221*f* in the other vehicles through the vehicle unit LAN by using static IP addresses in accordance with the IP to effect, e.g., monitoring of operation states of the terminal devices 221*a* to 221*f* installed in all the vehicles in the vehicle unit 2 or transmission of a control command for controlling operations.

In each of the plurality of terminal devices 221*a* to 221*f*, its operation state is monitored and recorded during travel of the vehicle unit, the monitored state is judged under predetermined conditions to diagnose abnormalities, failures or needs for maintenance, and this diagnosis result is sequentially recorded with time. Each terminal device has diagnosing means and recording means for this operation, and information recorded in the recording means is transmitted to a request source in response to a request. It is to be noted that an emergency diagnosis result indicative of abnormalities or failures is transmitted to an arbitrary position in the system that requires this information through the network control device 223 connected with the corresponding terminal device. For example, an operating situation of a vehicle from start to end of an operation such as acceleration or deceleration of the motor that drives the vehicle or a use state of a brake is sequentially recorded and accumulated as time-series data. It is to be noted that the number of each terminal device is 1 in the drawing, but many door controllers, monitoring cameras, motors, air-conditioning devices, braking devices or illumination devices are provided in one vehicle, and a vehicle unit LAN IP address is set to each of these devices.

All the on-vehicle devices 22A to 22E installed in each vehicle of the vehicle unit have the same configuration, and hence a specific configuration of one of these devices will be explained with reference to FIG. 10.

Figure 10:
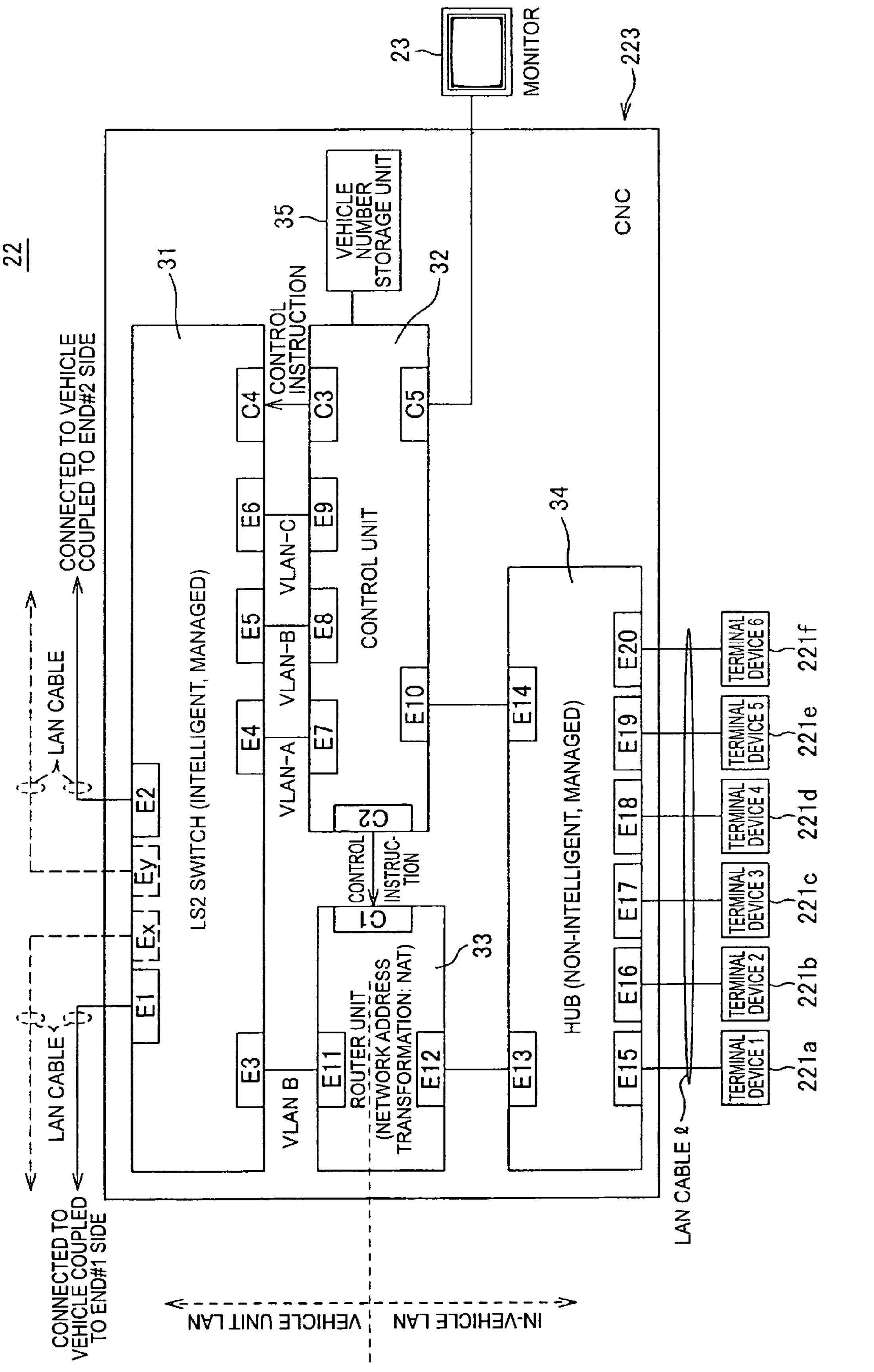
FIG. 10 is a view showing an example of a specific configuration of an on-vehicle device in FIG. 9.

In FIG. 10, the on-vehicle device is denoted by reference numeral 22 as a representative of all the on-vehicle devices 22A to 22E. The network control device 223 in the on-vehicle device 22 and the plurality of terminal devices 221*a* to 221*f* connected therewith are connected with the network control device 223 of a neighboring vehicle through the LAN cable L to constitute the vehicle unit LAN, and they are connected through the LAN cable to constitute an in-vehicle LAN. Therefore, vehicle unit LAN and in-vehicle LAN static IP addresses are set to each of the network control device 223 and the plurality of terminal devices 221*a* to 221*f*.

Further, the network control device 223 has a layer 2 (L2) switch 31, a control unit 32, a router unit 33, a hub 34, a vehicle number storage unit 35 as a vehicle identification number setting unit, and a control port C5 used as a monitor connection port to/from which a monitor 23 having a touch panel switch can be freely connected/disconnected. When a tag VLAN technology for setting a tag to each port of the L2 switch 31 is adopted, the single LAN cable can be used without arranging additional LAN cables to constitute three virtual LANs including two LANs that collect as own and neighboring vehicle information vehicle information of its own vehicle and vehicle information of vehicle information of a vehicle coupled with the first end portion and the second end portion and one LAN that collects all the own and neighboring vehicle information collected by each vehicle to automatically generate vehicle unit information.

Specifically, the L2 switch 31 has LAN ports E3 to E6 to which tags B, A, B and C are initialized and a serial interface (which will be referred to as a control port hereinafter) C4 such as RS232C besides the LAN port E1 to which tags A and B are initialized and the LAN port E2 to which tags B and C are initialized. The LAN port E2 or E1 of the L2 switch is connected to the LAN ports E1 and E2 depending on a direction of a neighboring vehicle coupled with the first end portion END#1 and the second end portion END#2 of an own vehicle through the LAN cable L. However, since communication can be achieved with the LAN port having the same tag set thereto alone, when communication cannot be performed with the neighboring vehicle, any tag change processing for changing the initialized tag must be performed, which will be explained later.

The L2 switch 31 transfers (switching) data received at the LAN ports E1 to E6 to the ports E1 to E6 having connectable destinations based on an MAC (Mac) address as destination information of the Layer 2 level. The data transmitted to the L2 switch 31 flows in the order of (1) reception of data, (2) fetching of an MAC frame, (3) creation of an address table, (4) retrieval of a port, and (5) transmission to a target port.

In (1) reception of data, when the L2 switch 31 receives data representing a bit "0" or "1" by a change in a current, it reads out "0" or "1" from a waveform of the current flowing through the LAN cable. In (2) fetching of an MAC frame, an MAC frame transmitted as a block including data that is to be transmitted by a transmission source, an MAC address of the transmission source, an MAC address of a destination, a type of data to be transmitted and others is fetched. Each of (3) creation of an address table and (4) retrieval of a port is processing concerning the MAC address written in the fetched MAC frame. Data that is first fetched is the MAC address of the transmission source, and database is formed in association with a number of the port that has received this data, thereby revealing an MAC address that is associated with each port. Then, the MAC address of the destination is fetched, and this address is collated with the database created at the former step, thereby revealing a port connected with a device having this MAC address. In last (5) transmission to a target port, the MAC frame is transmitted to the port that has been revealed in (4). The L2 switch and the device connected therewith can simultaneously transmit or receive data.

In short, when the L2 switch 31 receives data transmitted through the LAN cable, i.e., an electrical signal, it monitors the data to fetch an MAC frame. Then, an FCS (a frame check sequence) in the MAC frame is utilized to check whether data in the frame has a bit error, and the data is taken into a buffer if there is no bit error. A transmission source MAC address and a destination MAC address are read out simultaneously with fetching the MAC frame. If a correspondence table (an address table) of each input port and each transmission source MAC address has no information, address that is to be newly added is learned.

Although not shown, the control unit 32 has a central processing unit (CPU), a flash ROM as a nonvolatile memory storing a program and fixed data that is utilized to execute the program, and a microcomputer (MC) formed of, e.g. an SDRAM as a working memory that is utilized to execute the program, and it also has LAN ports E6 to E10 and control ports C2, C3 and C5. The LAN ports E4 to E6 of the L2 switch 31 are connected to the LAN ports E7 to E9 of the control unit 32 by using a connector through the LAN cable, and the control port C4 of the L2 switch 31 is connected to the control port C5 by using a connector. A monitor connection connector 36 is connected with the control port C5, and the monitor 23 having the touch panel switch can be connected to the control unit 32 via this connector.

The router unit 33 has a network address translation (NAT) table used for address transformation of vehicle unit LAN and in-vehicle LAN IP addresses as well as LAN ports E11 and E12 and a control port C1, and the LAN port E3 of the L2 switch 31 is connected to the LAN port E11 through the LAN cable by using a connector whilst the control port C2 of the control unit 32 is connected to the control port C1 by using a connector.

The hub 34 has LAN ports E13 to E20, the LAN port E12 of the router unit 33 is connected to the LAN port E13 by using a connector through the LAN cable, the LAN port E10 of the control unit 32 is connected to the LAN port E14 by using a connector through the LAN cable, and the plurality of terminal devices 221*a* to 221*f* are connected to the LAN ports E15 to E20 by using connectors through the LAN cable.

The vehicle number storage unit 35 previously stores each vehicle number as a mobile object identification code previously provided to enable identifying a vehicle in which the on-vehicle device 22A is installed, and it is connected to the control unit 32. The vehicle number storage unit 35 is formed of, e.g., a mechanical thumbwheel switch, a DIP switch or a nonvolatile memory that is mechanically attachable/detachable and from which the stored vehicle number can be electrically read out. Further, since the vehicle number storage unit 35 is fixed to an associated vehicle by using, e.g., a chain even in a state that it is removed from the network control device 223, it is prevented from being lost or being taken as a counterpart of a different vehicle. The vehicle number identifies a vehicle that does not overlap other respective vehicles, and it is grasped as a mobile object identification code when a vehicle is grasped as a mobile object. Therefore, the vehicle number storage unit corresponds to a mobile object identification code storage unit. For example, when a power supply of the on-vehicle device is turned on in response to ON of the operation key provided in, e.g., a motorman's cab, this vehicle number is utilized to generate vehicle unit LAN static IP addresses for the control unit 32 and each of the plurality of terminal devices 221*a* to 221*f* by the control unit 32 in accordance with predetermined rules.

Figure 11:
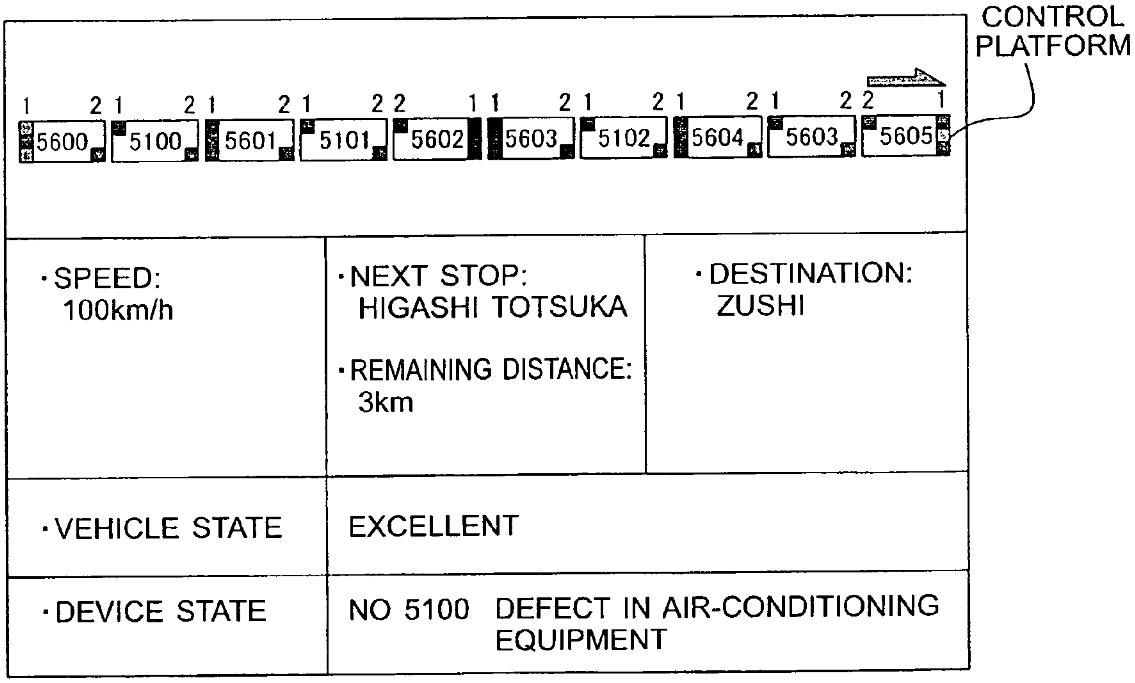
FIG. 11 is a view showing a display example displayed in a screen of a monitor in FIG. 10.

Although the monitor 23 having the touch panel switch is constantly connected with the control unit 32 through the monitor connection port C5 of the network control device in each vehicle at both ends of the vehicle unit having motorman's cabs, a portable monitor owned by a conductor or a person in charge of maintenance is connected to the control unit 32 via the monitor connection port C5 in the other vehicles as required. When the monitor 32 is connected with the control unit 32 via the monitor connection port C5, a screen of the monitor 32 displays unit information of the vehicle unit or terminal device information of each vehicle generated by the control unit 32. The screen of the monitor 32 is utilized as a monitor screen that displays a monitoring result or an inspection result as well as a touch operation panel utilized when performing, e.g., monitoring or control of the plurality of terminal devices 221*a* to 221*f* installed in all the vehicles in the vehicle unit 2. FIG. 11 shows a display example displayed in the screen of the monitor 23. For example, when one vehicle in the vehicle unit displayed in the screen of the monitor 23 is touched, the screen displayed in the monitor 23 is switched to a selection screen for the plurality of terminal devices installed in this vehicle. The vehicle unit information is utilized to be displayed in the monitor 23 connected to the monitor connection port C5 of the network control device 223 so as to allow connection/disconnection to improve the user interface so that the vehicle information of the entire organized vehicles can be grasped, for example. Furthermore, when a terminal device has abnormalities, failures or needs for maintenance, a color of the corresponding terminal device displayed in the monitor 23 is changed, whereby management of the vehicles including management of the terminal devices mounted in each vehicle can be facilitated.

With the above-described configuration, the L2 switch 31 transmits, as an electrical signal, data from the control unit 32 or data received from the terminal devices 221*a* to 221*f* through the in-vehicle LAN in the form of a packet via the LAN ports E1 and E2. Moreover, the electrical signal is received to take out data from the packet, and the data is transmitted to the control unit 32 or the terminal devices 221*a* to 221*f* from the router unit 33 through the in-vehicle LAN in accordance with a destination IP address. The router unit 33 has an NAT table for effecting address transformation between an in-vehicle LAN static IP address and a vehicle unit LAN static IP address that consists of a predetermined fixed value previously provided to each of the terminal devices 221*a* to 221*f*, and it rewrites an IP address based on this NAT table. The NAT table set to this router unit 33 is created by using the port numbers as described above.

It is to be noted that, since each in-vehicle LAN static IP address used in the in-vehicle LAN alone is not supplied to the outside of a vehicle, the same in-vehicle LAN static IP addresses are provided to the on-vehicle devices mounted in all the vehicles. However, since each vehicle unit LAN static IP address is also received by the on-vehicle devices of the other vehicles, nonredundant vehicle unit LAN static IP addresses must be provided to the on-vehicle devices installed in all the vehicles. Data required for this vehicle unit LAN IP address communication is called "communication data".

The CPU of the control unit 32 has a flash ROM as recording means for sequentially recording abnormality and failure information transmitted from the plurality of terminal devices 221*a* to 221*f* through the in-vehicle LAN when the plurality of terminal devices 221*a* to 221*f* have abnormalities or failures as a result of diagnosis, and the abnormality and failure information is all transmitted to the control units 32 of the network control devices in all the vehicles through the vehicle unit LAN. Therefore, the abnormality and failure information is reflected in the screen of the monitor 23 connected to the control unit 32.

Additionally, the CPU of the control unit 32 has address generating means for generating a vehicle unit LAN static IP address required to create the NAT table for routing set to the router unit 33. Therefore, the CPU of the control unit 32 generates and provides under predetermined rules vehicle unit LAN static IP addresses for the plurality of the terminal devices 221*a* to 221*f* and the network control device 223 (the control unit 32) in the on-vehicle device based on a vehicle number input from the vehicle number storage unit 35 when the power supply of the on-vehicle device is turned on.

Further, the CPU of the control unit 32 generates the NAT table based on the generated vehicle unit LAN static IP addresses and fixed values of the in-vehicle LAN static IP addresses previously provided to the plurality of terminal devices 221*a* to 221*f* and the network control device 223 (the control unit 32) in the on-vehicle device. This generated NAT table is transmitted to the router unit 33, and it is utilized to configure a setting for communication between the plurality of terminal devices 221*a* to 221*f* and the network control device 223 (the control unit 32) by the router unit 33.

Furthermore, the CPU of the control unit 32 forms a configuration setting for communication between the on-vehicle devices 12 through the vehicle unit LAN, and it carries out processing for generating and providing vehicle unit LAN static IP addresses and processing for generating the NAT table for this setting. The flash ROM of the control unit 32 stores a program required to execute such processing as well as various kinds of fixed values or address information used in the processing, and it also stores the generated vehicle unit LAN static IP addresses and the NAT table as own vehicle information. Specifically, as the fixed value, fixed values assigned to the in-vehicle LAN static IP addresses, their subnet mask and a vehicle unit LAN subnet mask or any other predetermined fixed values used for, e.g., routing are stored.

In this example, a fixed value of 192.168.0.1 is assigned to the control unit 32 and fixed values of 192.168.0.11 to 192.168.0.16 are assigned to the plurality of terminal devices 221*a* to 221*f* as the in-vehicle LAN static IP addresses. A fixed value of 24 bits is assigned to their subnet mask. A fixed value of 172.17.41.1 is assigned to the control unit 32 and fixed values of 172.17.41.11 to 172.17.41.16 are assigned to the plurality of terminal devices 221*a* to 221*f* as the vehicle unit LAN static IP addresses. A fixed value of 16 bits is assigned to their subnet mask.

As the address information, there is stored an arithmetic expression representing a relationship between vehicle numbers previously provided to enable identifying all vehicles in which the on-vehicle devices 12 are installed and the vehicle unit LAN static IP addresses determined in association with the respective vehicle numbers under predetermined rules, or a vehicle number-IP address correspondence table obtained by performing calculation based on the arithmetic expression.

Since each IP address utilized in association with a vehicle number in the on-vehicle device installed in each vehicle is already known to the on-vehicle devices in the other vehicles, the vehicle number of the vehicle having this IP address can be specified from a transmission source address of data that is transmitted to the on-vehicle devices in the other vehicles. That is, when the data generation information for mapping from each vehicle number to each IP address is shared by the on-vehicle devices, giving one of the IP address and the vehicle number enables assuredly estimating the other associated therewith.

It is to be noted that the generated vehicle unit LAN static IP address is combined with the in-vehicle LAN static IP address consisting of a fixed value to be used for generation of the NAT table. In the on-vehicle devices installed in the vehicles having the vehicle numbers 5601 to 5603, the control unit 32 generates such vehicle unit LAN static IP addresses as depicted in FIG. 12 and the NAT table, and the generated NAT table is supplied to the router unit 33 to be stored in the RAM in the router unit 33.

Figure 12:
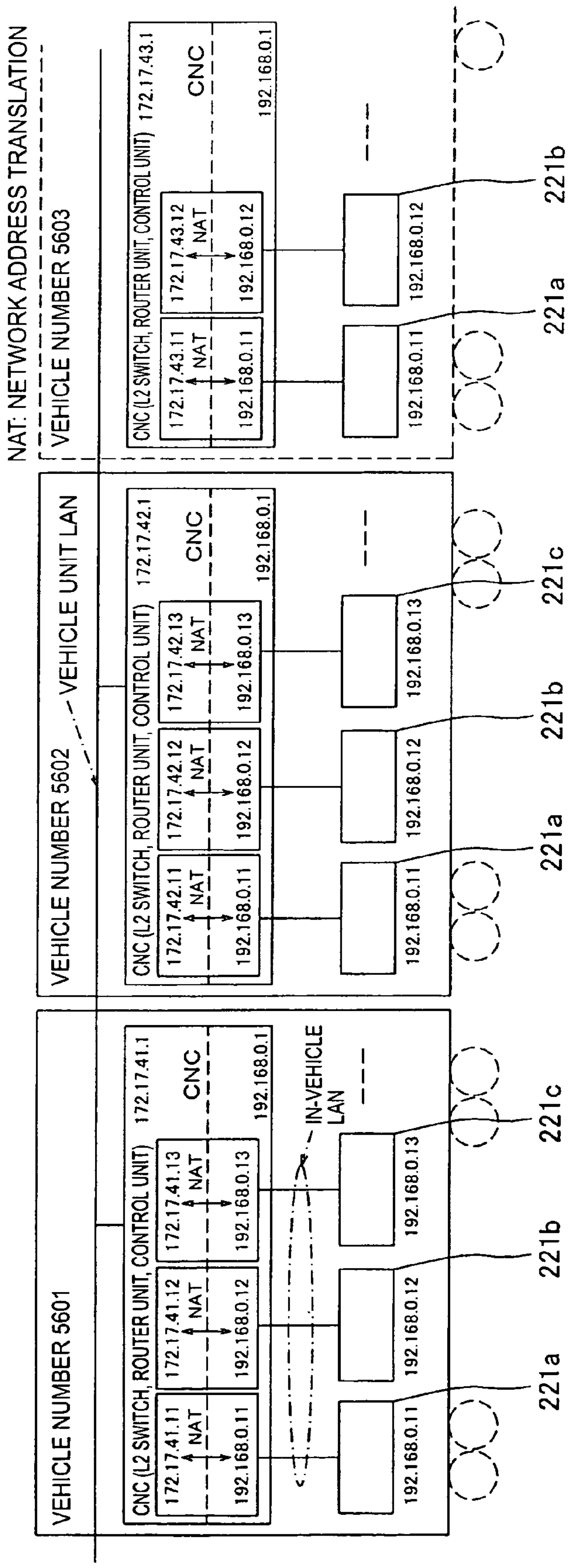
FIG. 12 is a view showing an IP address and an NAT table generated from a vehicle identification code and provided.

In the example depicted in FIG. 12, aaa is fixed to 172, bbb is fixed to 17, and ddd is fixed to the same value as ddd of an in-vehicle LAN IP address. [(vehicle number÷256)+41] is calculated when a remainder of (vehicle number÷256) is less than 214, and [255−(vehicle number÷256)] is calculated when a remainder of the vehicle number÷256 is not smaller than 214, thereby obtaining ccc. As a result, IP addresses having ccc of 41 to 256 and 0 to 40 are generated with respect to 256 vehicles having vehicle numbers of 5601 to 5857. In place of this method, "vehicle number"−"start number of vehicle number" can be determined as a numerical value of ccc, and different IP addresses can be provided to the 256 vehicles. In any case, when providing IP addresses to 256 or more vehicles is desired, nonredundant IP addresses can be generated and provided to more than 256 vehicles by incrementing a numerical value of bbb every time values of 0 to 255 are used for ccc.

The CPU of the control unit 32 performs tag VLAN setting processing, neighboring vehicle information acquisition processing, vehicle unit information acquisition processing, monitoring or control processing for the plurality of terminal devices 221*a* to 221*f* and others besides the processing for generating and providing communication data including the vehicle unit LAN static IP addresses or the NAT table, and a program used for such processing is stored in the flash ROM.

In the VLAN setting processing, the CPU of the control unit 32 first initializes tags A to C that freely operates a range, i.e., a broadcast domain by using the L2 switches as follows. That is, three VLANs (virtual LANs) cutting across the plurality of L2 switches are configured. One of them is a VLAN having the set tag A configured to perform communication with the on-vehicle device 12 of a neighboring vehicle coupled with the first end portion END#1 of each vehicle alone, and another one is a VLAN having the set tag C configured to perform communication with the on-vehicle device 12 of a neighboring vehicle coupled with the second end portion END#2 of each vehicle alone, and the other one is a VLAN having the set tag B configured to perform communication with the on-vehicle device 12 of an arbitrary vehicle in the vehicle unit.

As a result, all devices are physically connected to one LAN constituted of the L2 switch, but the LANs that are logically separated from each other can be realized, and the number of LAN cables are reduced. A tag VLAN distinguishes the VLANs in frames by inserting tag information to a frame (the MAC frame) utilized in the LANs. A device or the L2 switch sees this tag to identify a VLAN from which the frame is output, and it configures a setting to supply this frame to the corresponding VLAN alone.

In regard to tag information, tag information of 4 bytes is inserted into a header portion of the regular MAC frame. A first half, i.e., first 2 bytes in the 4 bytes represents a type of the frame. A value "8100" (a hexadecimal number) is put in these bytes. A latter half, i.e., last 2 bytes in the 4 bytes represents tag control information, and 12 bits in this part become information required to identify a VLAN. If information is written in this field, it can be revealed from this information that the packet is a frame output from a VLAN associated with the written information.

In the neighboring vehicle information acquisition processing, the CPU of the control unit 32 communicates with the control unit 32 of the on-vehicle device 12 of a neighboring vehicle coupled with each of the first end portion END#1 and the second end portion END#2 through the VLANs having the set tag A and the set tag C to acquire own vehicle information stored in the flash ROM of each control unit 32 as neighboring vehicle information, and it stores the acquired neighboring vehicle information and its own vehicle information as own/neighboring vehicle information in the flash ROM.

At this time, when every other vehicles in the vehicle unit are coupled in opposite directions, since the LAN ports having the same tag initial value are connected through the LAN cable, mutual communication is possible even if a tag set value indicative of a data exchange range is not changed from the initial value. However, when all the vehicles in the vehicle unit are coupled in the same direction or when every other vehicles are not coupled in the opposite directions, mutual communication is impossible. Therefore, the CPU of the control unit 32 first judges whether communication with neighboring vehicles is possible while keeping the set value of each VLAN to the initial setting prior to the neighboring vehicle information acquisition processing, and it changes the initial set value of each VLAN so that the LAN ports connected through the LAN cable can have the same tag and tries communication if communication is impossible, thereby achieving communication with the neighboring vehicles. At this time, when each set value is changed, a change history is left as a part of the own vehicle information stored in the flash ROM. Since the first end side and the second end side cannot be discriminated from each other when the communicating means at both the ends have the same set value in the same vehicle, reconfiguration of A and C settings is performed while confirming the settings in the neighboring vehicles. That is, it is good enough to configure the settings of A and C like A-C, C-A, A-C, . . . from a vehicle at the end. As to this reconfiguration and reprovision, one vehicle in organized vehicles may be determined as a main vehicle (a master) and the other vehicles may be determined as sub-vehicles (slaves) by a predetermined method, thereby coordinating settings of the sub-vehicles to that of the main vehicle.

In the vehicle unit vehicle information acquisition processing, the CPU of the control unit 32 adds its own vehicle unit LAN static IP address to a transmission source and uses a broadcast method to transmit a transmission request command for requesting transmission of own/neighboring vehicle information held in its own flash ROM to each of the control units 32 of the on-vehicle devices 12 in all the vehicles in the vehicle unit through the VLAN having the set tag B. The CPU of the control unit 32 receives and acquires the own/neighboring vehicle information transmitted from all the vehicles with the own vehicle unit LAN static IP address being used as a destination address, and stores the acquired own/neighboring vehicle information of all the vehicles in its own flash ROM as vehicle unit vehicle information. The stored vehicle unit vehicle information is used for generating vehicle unit information. Since the own/neighboring vehicle information in the acquired and stored vehicle unit vehicle information can reveal how set values of its own and the neighboring vehicles are changed from the initial settings, the generated vehicle unit information can inform a direction of coupling of each vehicle in the vehicle unit.

Therefore, the network control device 223 (the control unit 32) and the plurality of terminal devices 221*a* to 221*f* constitute an in-vehicle LAN that performs communication by using each IP address in accordance with the IP when the plurality of terminal devices 221*a* to 221*f* are connected to the hub 34 of the network control device 223 via the connectors. To achieve communication through the in-vehicle LAN, static IP addresses each consisting of a provided in-vehicle LAN fixed value are preset to the network control devices 223 (the control units 32) and the plurality of terminal devices 221*a* to 221*f* in all the vehicles. It is to be noted that the in-vehicle LAN static IP address is used in the in-vehicle LAN in a vehicle alone and not supplied to the outside of the vehicle, and hence the same in-vehicle LAN static IP address is provided to each of the on-vehicle devices (the network control devices 223 (the control units 32) and the plurality of terminal devices 221*a* to 221*f*) mounted in all the vehicles. When the same in-vehicle LAN static IP address is provided to the same device, provision of the in-vehicle LAN static IP address that is performed when replacing devices due to a failure does not become a concern.

Further, the network control device 223 (the control units 32) and the plurality of terminal devices 221*a* to 221*f* constitute three vehicle unit tag VLANs that perform communication by using each IP address in accordance with the IP when the control unit 32 is connected to the L2 switch of the network control device 223 of a neighboring vehicle through the L2 switch 31 and the LAN cable L and the plurality of terminal devices 221*a* to 221*f* are connected to the same through the LAN cable, the hub 34, the router unit 33 and the L2 switch 31, respectively. One of the VLANs is constituted of the network control devices 223 (the control units 32) and the plurality of terminal devices 221*a* to 221*f* of all the vehicles in the vehicle unit, and each of the other two VLANs is constituted between the network control devices 223 (the control units 32) adjacent to the first terminal portion and the second terminal portion alone. To achieve communication through these vehicle unit LANs, respective provided vehicle unit LAN static IP addresses are set to the network control devices 223 (the control units 32) and the plurality of terminal devices 221*a* to 221*f* in all the vehicles, and the NAT table required to effect address conversion between each in-vehicle LAN static IP address and each vehicle unit LAN static IP address to carry out routing is set to the router unit 33. It is to be noted that, since the vehicle unit LAN static IP addresses are also received by the on-vehicle devices (the network control devices 223 (the control units 32) and the plurality of terminal devices 221*a* to 221*f*) in the other vehicles, nonredundant vehicle unit LAN static IP addresses must be provided to the on-vehicle devices (the network control devices 223 (the control units 32) and the plurality of terminal devices 221*a* to 221*f*) installed in all the vehicles. Data, e.g., the vehicle unit LAN IP addresses and the NAT table required for communication in the vehicle unit LAN is called "communication data".

The control unit 32 also functions as address generating means for generating each vehicle unit LAN static IP address required to generate the NAT table set to itself and the router unit 33. Therefore, the control unit 32 includes the vehicle number storage unit 35 serving as a vehicle identification code storage unit that previously stores each vehicle number as a mobile object identification code previously provided to enable identifying a vehicle in which the on-vehicle device 12A is installed. The control unit 32 generates and provides under predetermined rules vehicle unit LAN static IP addresses for the network control device 223 (the control unit 32) and the plurality of the terminal devices 221*a* to 221*f* in the on-vehicle device 12A based on a vehicle number input from the vehicle number storage unit 35 when the power supply of the on-vehicle device is turned on.

Figure 13:
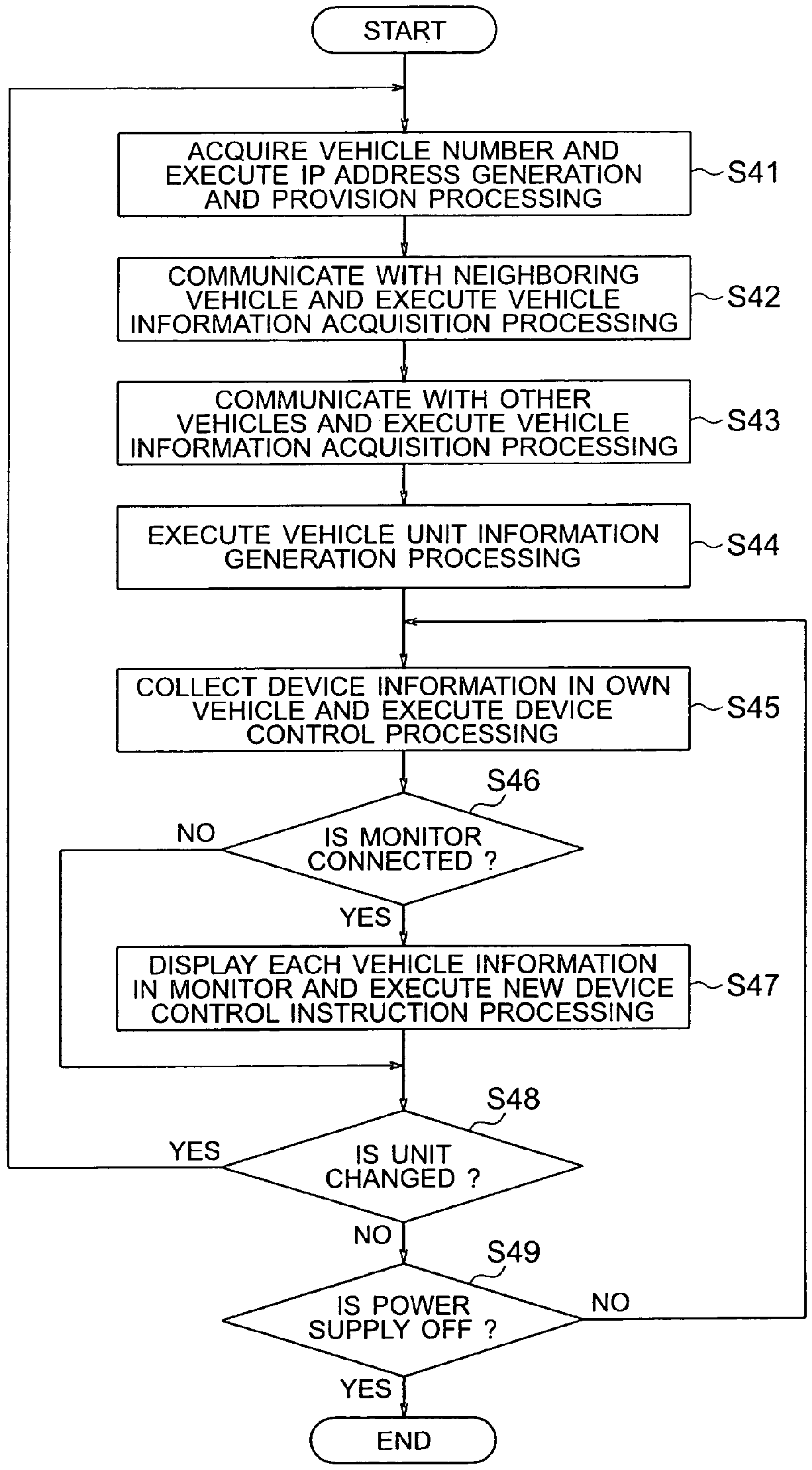
FIG. 13 is a view showing a flowchart for explaining an operation of a network control device in the network system for organizing vehicles.
Figure 14:
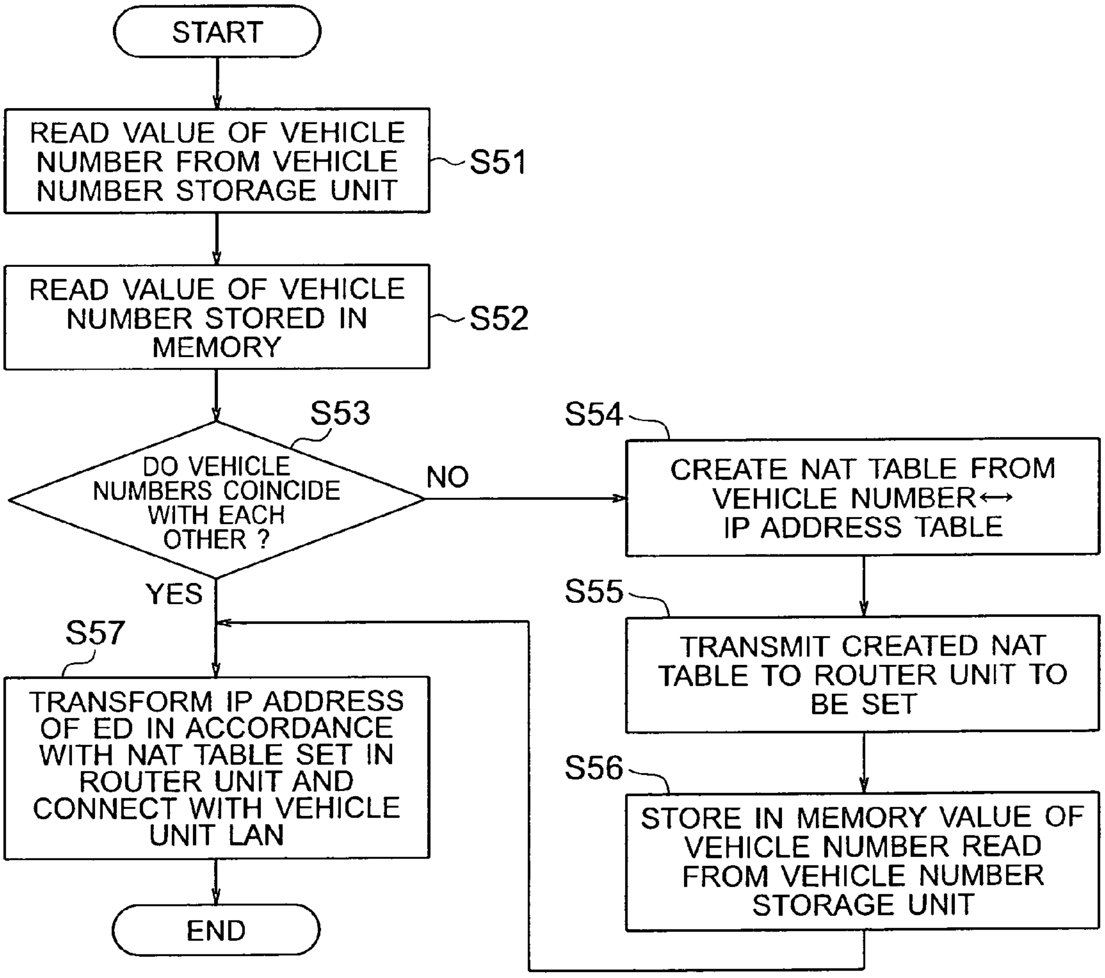
FIG. 14 is a view showing a flowchart for explaining an operation of the network control device in regard to generation and provision of an IP address and an NAT table.

An operation of the network control device 223 in the network system for organizing vehicles depicted in FIG. 10 will now be explained with reference to a flowchart of FIG. 13. When an operation is started in response to turning on the power supply or an operation start instruction, generation of an IP address and provision of the generated IP address are performed. The generation and the provision of an IP address and an NAT table shown at steps 41 to 46 in FIG. 14 will now be explained in detail.

Each IP address must be provided in such a manner that addresses do not overlap in a communication range. In FIG. 10, the vehicle number storage unit 35 having nonredundant vehicle numbers in each vehicle recorded in a switch or a memory is connected to the CPU. Furthermore, in FIG. 10, the vehicle number storage unit 35 is also connected to the control unit 32. The CPU of the control unit 32 in FIG. 10 obtains vehicle numbers from the vehicle number storage unit 35 to generate IP addresses from these numbers. The IP addresses generated here are inherent to each vehicle, and they are static IP addresses that do not vary after the generation.

Each vehicle number and each generated static IP address have a one-to-one relationship, and this relationship may be generated and prepared as a table in advance or may be generated each time based on a predetermined algorithm. When a correspondence table of each vehicle number and each private IP address is prepared in advance as an IP address generation method and this table is stored in the memory, the control unit 32 that has obtained each vehicle number can readily generate an IP address associated with this vehicle number by making reference to the correspondence table.

For example, a situation where a nonredundant private static IP address of class B is generated from a vehicle number will be explained. A 32-bit IP address is divided every 8 bits to be decimally represented, this address is expressed as aaa, bbb, ccc and ddd, a fixed value of 172 is assigned to aaa, a fixed value of 017 is assigned to bbb, and ccc and ddd are generated based on the vehicle number.

Although the vehicle number may be expressed by using characters and numerical values representing properties of a vehicle like mo1234, each vehicle can obtain a nonredundant numerical value based on information obtained from the vehicle number storage unit by changing the vehicle number into an appropriate numerical value based on a fixed rule, e.g., an ASCII code. FIG. 12 shows vehicles having vehicle numbers 5601 to 5603.

When the control unit 32 compares the read vehicle number and each vehicle number in the memory and they coincide with each other, since the correspondence table of each vehicle number and each IP address has been already created and set to the router, each terminal device (ED) uses the router unit 33 to transform the IP address, thus achieving connection to the vehicle unit LAN (a step 57).

Moreover, when both the read values are compared and they do not coincide with each other, an IP address of the vehicle is generated from a vehicle number newly read from the vehicle number storage unit 35 and the IP address correspondence table, and a correspondence table of a vehicle unit LAN of each terminal device and an in-vehicle LAN address of the device (the NAT table) is created (a step 54). Additionally, the generated NAT table is set to the router unit 33 (a step 55).

Further, a value of the vehicle number read from the vehicle number storage unit 35 is stored in the memory (a step 56). Thereafter, based on the NAT table read to the router unit 33 as a portion having the correspondence table of each address that can be used outside and each address that can be used in a vehicle alone, an IP address of each terminal device is transformed, and connection to the vehicle unit LAN is achieved (the step 57).

The network control device provides the IP address and the NAT table generated in the above-described manner to itself or the router unit as required (a step 41).

Specific generation of each IP address will now be described with reference to FIG. 12. When a vehicle number 5600 is subtracted from each value read by the CPU of the control unit 32, numerical values 1 to 3 are obtained. As network addresses, a value obtained by adding each of the above-described values to 40 is used as ccc, and 1 is used as ddd. As shown in FIG. 12, a vehicle number 5601 has an IP address 172.17.41.1, a vehicle number 5602 has an IP address 172.17.42.1 and a vehicle number 5603 has an IP address 172.17.43.1 as an example of a provision state of the thus generated IP addresses.

Provision of an IP address of each terminal device mounted in each vehicle will now be described. Here, assuming that an IP address provided to the device belongs to class C, high-order 16 bits in the IP address become 192.168, and low-order 16 bits are provided to the device mounted in each vehicle.

For example, assuming that low-order bits in the IP address start from 11, the IP address starts from 192.168.0.11, and numerical values of the low-order bits are sequentially changed and provided to the terminal device 221*a* (ED1). Here, since the IP address of each device is the same in the respective vehicles, reprovision of the IP address is not required even if the device is replaced, thereby facilitating management.

Since the IP address provided to the device is common to the respective devices, information of each terminal device of a vehicle cannot be supplied to the outside with the original IP address. Thus, a unit LAN IP address provided to the vehicle network control device in each vehicle must be utilized to effect conversion into an IP address that can be used in the vehicle unit LAN that covers the entire vehicle unit.

As one method, 3 high-order octets in the IP address are connected with 1 low-order octet in the IP address provided to the device, thereby obtaining a 4-octet IP address. FIG. 12 shows a state of this association.

Based on the above explanation, IP addresses are provided to all the devices connected to the vehicle unit LAN. Then, the network control device communicates with a neighboring vehicle to acquire vehicle information as described above (a step 42).

Moreover, a setting of VLAN-B is configured with respect to the control unit 32 and the L2 switch, an environment that information can be exchanged in the entire vehicle unit is produced, and communication is effected with another vehicle to obtain information of this vehicle (a step 43). Subsequently, vehicle unit information is generated by organizing the obtained vehicle information (a step 44).

In regard to an own vehicle, E10 and E14 ports depicted in FIG. 10 are used to collect information from the terminal devices connected with the hub, and this information is collected in the information collection storage unit and accumulated as own vehicle information. Additionally, control information required for each terminal is supplied to perform a predetermined operation. The predetermined operation includes various contents such as opening/closing doors, ON/OFF of an illumination, control over the motor, setting of an air-conditioning equipment temperature and others (a step 45). Here, since all the vehicles have the same terminal device IP addresses, monitoring and control programs of the network control device can be shared.

In the network control device, the connector 36 as a connection unit for connecting the monitor 23 that performs display and accepts manual input of control information is provided. When the monitor 23 is connected with this connector 36, this connection is sensed (a step 46), predetermined information is supplied to the connector 36 to effect such display as depicted in FIG. 11 in a screen of the monitor 23 (a step 47).

As how to use the monitor 23, when supplying data from the monitoring camera (ED2) having a vehicle identification number 5601 to, e.g., the rearmost vehicle where a conductor is present, an IP address 192.168.0.12 of a transmission source is converted into 172.17.41.12 by the router, and it is supplied to the conductor in the rearmost vehicle. Further, in case of an instruction of operating the monitoring camera from the conductor, the IP address 172.17.41.12 of the transmission source is transmitted and received by the router having a network address 172.17.41.1, and this IP address is converted into 192.168.0.12 and supplied to the monitoring camera.

Upon receiving a notification that a vehicle unit is changed due to, e.g., interruption of connection between the vehicles, the network control device returns to the beginning of the processing (the step 48), and hence each vehicle after division can constitute a new vehicle unit even if the vehicle unit is divided due to a failure. The LAN port includes link pulse transmitting means, and it can judge whether the LAN is physically connected. When coupling or opening of the vehicles is recognized by a change in a situation of a physical link (presence of the physical link changes to absence, or absence of the physical link changes to presence) or by waiting for additional digital input information applied at the time of coupling, it is determined that the vehicles are coupled or released, and the system returns to an initialization routine (the step 41) to again collect unit information. In a usual situation that the vehicle unit is not changed in particular, when ON/OFF of the power supply is detected and the power is ON, the control returns to the processing at the step 45 (a step 49).

As described above, the network control device in each vehicle can exchange information with neighboring vehicles and obtain vehicle information constituting a train. As the vehicle information, there are a vehicle identification code of each vehicle, a direction of a vehicle, and an IP address of each device mounted in each vehicle besides information of each terminal device mounted in each vehicle.

In the present invention, when the monitor 23 is connected to the network control device 223 of the network system for organizing vehicles in an arbitrary vehicle, information of all the devices in all the vehicles can be obtained, and these devices can be controlled at the same time.

Resistance again failures can be obtained since the switches are connected to each other to constitute the network, and a degree of freedom in the network configuration is high and management of the vehicle network can be facilitated since the VLANs on the IP level are utilized for logical division.

In the above example, information exchange is enabled in the entire vehicle unit through the LAN ports E1 and E2 by adopting the tag VLANs, thereby omitting wiring lines. However, as indicated by dotted lines in FIG. 10, LAN ports Ex and Ey can be provided to the L2 switch to provide a port VLAN configuration. However, when the tag VLANs are adopted, the LAN ports Ex and Ey may be configured as a double system by allowing overlap of a wiring line between these ports and a wiring line between the LAN ports E1 and E2, thereby improving resistance again failures.

Additionally, in the network system for organizing vehicles, although a simultaneous operation instruction for the terminal devices is usually issued, the operation instruction cannot arrive the terminal devices due to mismatch of network addresses in the router unit 33 when this instruction is issued in a broadcast manner. Thus, a default gateway (DGW) 192.168.0.1 is set to the router unit 33 in advance, instruction information for specific terminal devices that is put in a data portion and supplied in the broadcast manner is caused to reach the terminal devices, thereby enabling the simultaneous operation for the specific terminal devices.

It is to be noted that the L2 switch is utilized to constitute the three VLANs in the embodiment depicted in FIG. 10, but they can be constituted without using the L2 switch.

In the foregoing embodiment, the vehicle unit LAN static IP addresses are set to the network control device 223 and the plurality of terminal device 221*a* to 221*f* connected therewith in the on-vehicle device 22, respectively. Further, the L2 switch 31, the control unit 32, the router unit 33, the hub 34 and the vehicle number storage unit 35 are provided to the network control device 223 so that the network control device 223 can be connected with the plurality of terminal devices 221*a* to 221*f* through the in-vehicle LAN, and the means for generating and providing the communication data including each vehicle unit LAN static IP address or the NAT table in the router unit 33 is provided in the control unit 32, but each static IP address for one vehicle unit LAN as the on-vehicle device 22 may be provided. In this case, it is good enough for the means for providing the communication data to generate and provide each IP address of the on-vehicle device 22, and the NAT table does not have to be generated and provided. However, when the vehicle unit LAN static IP addresses are provided to the network control device 223 and the plurality of terminal devices 221*a* to 221*f* and these devices are connected to each other through the in-vehicle LAN, a ready-made article that is available at a low price can be used, and the on-vehicle device 22 can be inexpensively configured, which is advantageous.

Further, in the foregoing embodiment, the system includes the communication data generating means for generating the communication data based on each vehicle number stored in the vehicle number storage unit 35 in which the on-vehicle device 22 is installed and the prepared data generation information such as tables or arithmetic expressions representing the communication data predetermined in association with the vehicle number, the communication data providing means can provide the communication data based on the communication data generated by the communication data generating means, and the communication data does not have to be provided by a manual input operation.

However, the system may include detachable communication data storing means having a nonvolatile memory such as a flash memory or an ROM that stores communication data which should be set to the on-vehicle device 22 and that is generated based on prepared data generation information indicative of communication data that is predetermined in association with a vehicle number previously provided to a vehicle in which the on-vehicle device 22 is installed to enable identifying this vehicle and a vehicle number of the vehicle in which the on-vehicle device 22 to which the communication data should be set is installed.

In this case, the communication data can be stored in the communication data storing means by, e.g., inputting a vehicle number to a personal computer previously having data generation information by a key operation to generate communication data associated with the vehicle number based on the input vehicle number and the data generation information and writing the generated communication data into the detachable communication data storing means. The communication data storing means having the communication data written therein is detachably disposed to the on-vehicle device installed in a vehicle having a vehicle number printed on a label by attaching the label having the vehicle number associated with the stored communication data printed thereon to a package of the communication data storing means. Furthermore, reading out the communication data stored in the communication data storing means enables providing the communication data to the on-vehicle device or the network control device 223 and the plurality of terminal devices 221*a* to 221*f* from the communication data providing means, and the communication data does not have to be input by a manual input operation.

However, when the communication data generating means is provided like the illustrated embodiment, preparing the vehicle number storage unit 35 storing each provided vehicle number can suffice, and the trouble of previously preparing the communication data storing means storing the communication data can be omitted.

Moreover, in the foregoing embodiment, the same modifications or changes as those in the embodiment depicted in FIGS. 1 to 8 can be carried out.

It is to be noted that the foregoing embodiment just shows a typical conformation of the present invention, and the present invention is not restricted to the embodiment. That is, various modifications can be carried out without departing from the scope of the present invention.

What is claimed is:

1. A method for providing communication data that provides communication data, which is utilized to identify a device on a mobile object at the time of communication, to the device on a mobile object that is installed on a mobile object and constitutes at least a part of a network system that performs communication in accordance with a predetermined communication protocol through an LAN, the method comprising:

generating the communication data that should be set to the device on a mobile object based on prepared data generation information representing the communication data predetermined in association with a mobile object identification code previously provided to the mobile object on which the device on a mobile object is installed to enable identifying the mobile object and the mobile object identification code of the mobile object on which the device on a mobile object to which the communication data should be set is installed;

providing the generated communication data to the device on a mobile object as the communication data that should be set to the device on a mobile object;

sequentially storing failure history information and diagnosis results with time about the device on a mobile object, and generating a routing table in dependence upon a generated static I.P. address for the LAN, in a first information storage unit;

sequentially recording a condition of a brake as time-series data from start to end of an operation, and receiving a user ID and a password in a second information storage unit in dependence upon a vehicle number input, wherein the first information storage unit, the second information storage unit, and the device on a mobile object are connected with each other; and communicating between the device on a mobile object and a ground device, wherein the ground device is installed on the ground and is connected to the device on a mobile object through the LAN, wherein the ground device includes a collection server unit that collects and stores mobile object information, an authentication server unit that authenticates access to an access point, and at least one wireless communication unit that communicates with the device on a mobile object.

2. A device for providing communication data that provides communication data, which is utilized to identify a device on a mobile object at the time of communication, to the device on a mobile object that is installed on a mobile object and constitutes at least a part of a network system that performs communication in accordance with a predetermined communication protocol through an LAN, the device comprising:

communication data providing means for providing to the device on a mobile object the communication data that should be set to the device on a mobile object and that is generated based on prepared data generation information representing the communication data predetermined in association with a mobile object identification code previously provided to the mobile object on which the device on a mobile object is installed to enable identifying the mobile object and the mobile object identification code of the mobile object on which the device on a mobile object to which the communication data should be set is installed;

a first information storage unit that sequentially stores failure history information and diagnosis results with time about the device on a mobile object, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the device on a mobile object are connected with each other; and a ground device installed on the ground, wherein the ground device is connected to the device on a mobile object through the LAN, wherein the ground device comprises at least:

a collection server unit that collects and stores mobile object information;

an authentication server unit that authenticates access to an access point; and at least one wireless communication unit that communicates with the device on a mobile object.

3. The device for providing communication data according to claim 2, further comprising communication data storing means for storing the communication data that should be set to the device on a mobile object and that is generated based on prepared data generation information representing the communication data predetermined in association with a mobile object identification code previously provided to the mobile object on which the device on a mobile object is installed to enable identifying the mobile object and the mobile object identification code of the mobile object on which the device to which the communication data should be set is installed, wherein the communication data providing means provides the communication data by reading out the communication data stored in the communication data storing means.

4. The device for providing communication data according to claim 2, further comprising:

mobile object identification code storing means for storing a mobile object identification code previously provided to the mobile object on which the device on a mobile object is installed to enable identifying the mobile object; and communication data generating means for generating the communication data based on the mobile object identification code stored in the mobile object identification code storing means and the prepared data generation information representing the communication data predetermined in association with the mobile object identification code, wherein the communication data providing means provides the communication data based on the communication data generated by the communication data generating means.

5. The device for providing communication data according to claim 4, wherein the data generation information is an arithmetic expression configured to calculate and generate based on the mobile object identification code the communication data predetermined in association with the mobile object identification code.

6. The device for providing communication data according to claim 2, wherein the communication protocol is Internet Protocol, and the communication data includes an Internet Protocol address.

7. The device for providing communication data according to claim 2, wherein the mobile object identification code storing means has a switch that can set electrically readable numerical values or characters.

8. A data gathering system mobile object, comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device, the system comprising:

wireless communication data providing means for providing to the device on a mobile object the wireless communication data that should be set to the device on a mobile object and that is generated based on prepared data generation information, representing the wireless communication data predetermined in association with a mobile object identification code previously provided to the mobile object on which the device on a mobile object is installed to enable identifying the mobile object and the mobile object identification code of the mobile object on which the device on a mobile object to which the communication data should be set is installed; and an information storage unit that sequentially records a condition of a brake as time-series data from start to end of an operation, and receives a user ID and a password in dependence upon a vehicle number input, wherein the ground device comprises at least:

an authentication server that authenticates access to an access point.

9. A data gathering system for a mobile object, comprising a ground device installed on the ground and a plurality of devices on a mobile object each of which is installed on a mobile object, each of the devices on a mobile object comprising an information storage unit having mobile object information storing means for storing mobile object information including at least one of first mobile object information concerning a mobile object itself on which the device on a mobile object is installed and second mobile object information concerning a device mounted in the mobile object and a wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying the units being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device, the system comprising:

wireless communication data providing means for providing to the wireless communication unit of the device on a mobile object the wireless communication data that should be set to the wireless communication unit of the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to Which the wireless communication data should be set is installed; and an information storage unit that sequentially records a condition of a brake as time-series data from start to end of an operation, and receives a user ID and a password in dependence upon a vehicle number input, Wherein the ground device comprises at least:

an authentication server that authenticates access to an access point.

10. The data gathering system for a mobile object according to claim 8 or 9, further comprising wireless communication data storing means for storing the wireless communication data that should be set to the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed, wherein the wireless communication data providing means provides the wireless communication data by reading out the wireless communication data stored in the wireless communication data.

11. The data gathering system for a mobile object according to claim 8 or 9, further comprising:

mobile object identification code storing means for storing a mobile object identification code previously provided to the mobile object on which the device on a mobile object is installed to enable identifying the mobile object; and wireless communication data generating means for generating the wireless communication data based on the mobile object identification code stored in the mobile object identification code storing means and prepared data generation information representing the wireless communication data predetermined in association with the mobile object identification code, wherein the wireless communication data providing means provides the wireless communication data based on the wireless communication data generated by the wireless communication data generating means.

12. The data gathering system for a mobile object according to claim 11, wherein the data generation information is an arithmetic expression configured to calculate and generate wireless communication data for the wireless communication predetermined in association with a mobile object identification code based on the mobile object identification code.

13. The data gathering system for a mobile object according to claim 8 or 9, wherein the mobile object is a vehicle that travels on a track, and the ground device is installed to enable communication with the device on a mobile object that is installed in the vehicle.

14. The data gathering system for a mobile object according to claim 8, wherein the wireless communication data includes a wireless LAN static communication address that should be set to the device on a mobile object.

15. The data gathering system for a mobile object according to claim 9, wherein the wireless communication data includes a wireless LAN static communication address of the wireless communication unit and a routing cable that includes a wireless LAN static communication address and a cable LAN static communication address of the information storage unit.

16. The data gathering system for a mobile object according o claim 14 or 15, wherein the wireless communication data further includes an individual authentication code required for the ground device to allow connection of the device on a mobile object that has issued a connection request.

17. The data gathering system for a mobile object according to claim 7 or 8, wherein the communication protocol is Internet Protocol, and the communication address is an Internet Protocol address.

18. The data gathering system for a mobile object according to claim 14 or claim 15, wherein the device on a mobile object includes the wireless communication data providing means.

19. The data gathering system for a mobile object according to claim 11, wherein the device on a mobile object includes the mobile object identification code storing means and the wireless communication data generating means.

20. The data gathering system for a mobile object according to claim 9, wherein the information storage unit of the device on a mobile object includes the wireless communication data providing means.

21. The data gathering system for a mobile object according to claim 20, wherein the information storage unit of the device on a mobile object comprises:

mobile object identification code storing means for storing a mobile object identification code previously provided to the mobile object on which the device on a mobile object is installed to enable identifying the mobile object; and wireless communication data generating means for generating the wireless communication data based on the mobile object identification code stored in the mobile object identification code storing means and prepared data generation information representing the wireless communication data predetermined in association with the mobile object identification code, and the wireless communication data providing means provides the wireless communication data based on the wireless communication data generated by the wireless communication data generating means.

22. The data gathering system for a mobile object according to claim 21, wherein the mobile object identification code storing means is detachably disposed to the information storage unit.

23. The data gathering system for a mobile object according to claim 18, wherein the device on a mobile object uses the wireless communication data set to itself to perform wireless communication with the ground device every time an operation key of the mobile object is turned off when communication with the ground device is possible.

24. The data gathering system for a mobile object according to claim 20, wherein the wireless communication unit of the device on a mobile object uses the wireless communication data set to itself to perform wireless communication with the ground device every time an operation key of the mobile object is turned off when communication with the ground device is possible.

25. The data gathering system for a mobile object according to claim 24, wherein the wireless communication data providing means performs an operation of providing the wireless communication data before starting the wireless communication every time the operation key of the mobile object is turned off.

26. A device on a mobile object for a data gathering system for a mobile object, the device of which has mobile object information storing means that is installed in each of a plurality of mobile objects and stores mobile object information including at least one of first mobile object information concerning an installed mobile object itself and second mobile object information concerning a device mounted in the mobile object and is connected to a ground device installed on the ground through a wireless LAN to constitute a data gathering system for a mobile object, wireless communication data configured to effect wireless communication with the ground device by performing mutual identification through the wireless LAN in accordance with a predetermined wireless communication protocol being set, the device being connected with the ground device through the wireless LAN based on the wireless communication with the ground device using the set wireless communication data, the mobile object information stored in the mobile object information storing means being collected by the ground device, the device on a mobile object comprising:

wireless communication data providing means for providing to itself the wireless communication data that should be set and is generated based on prepared data generation information representing the wireless communication data predetermined in association with a mobile object identification code previously provided to the mobile object to be installed so as to enable identifying the mobile object and the mobile object identification code of the installed mobile object; and an information storage unit that sequentially records a condition of a brake as time-series data from start to end of an operation, and receives a user ID and a password in dependence upon a vehicle number input, wherein the ground device comprises at least:

an authentication server that authenticates access to an access point.

27. A device on a mobile object for a data gathering system for a mobile object, the device being installed in each of a plurality of mobile objects and comprising: an information storage unit having mobile object information storing means for storing mobile object information including at least one of first mobile object information concerning an installed mobile object itself and second mobile object information concerning a device mounted in the mobile object; and a wireless communication unit that is mutually connected to the information storage unit by mutually effecting cable communication through a cable LAN based on a predetermined cable communication protocol and performs wireless communication with the ground device through a wireless LAN based on a predetermined wireless communication protocol, wireless communication data configured to perform wireless communication between the ground device, the wireless communication unit and the information storage unit through the wireless LAN based on a predetermined communication protocol by mutual identification being set to the wireless communication unit, the device on a mobile object being connected to the ground device through the wireless LAN based on wireless communication using the set wireless communication data, the mobile object information stored in the mobile object information storing means of the information storage unit being collected by the ground device, the device on a mobile object comprising:

wireless communication data providing means for providing to the wireless communication unit the wireless communication data that should be set to the wireless communication unit of itself and is generated based on prepared data generation information representing the wireless communication data predetermined in association with a mobile object identification code previously provided to the mobile object to be installed so as to enable identifying the mobile object and the mobile object identification code of the installed mobile object; and an information storage unit that sequentially records a condition of a brake as time-series data from start to end of an operation, and receives a user ID and a password in dependence upon a vehicle number input, wherein the ground device comprises at least:

an authentication server that authenticates access to an access point.

28. A method for providing wireless communication data for a data gathering system for a mobile object, the method providing the wireless communication data to a device on a mobile object in the data gathering system for a mobile object, the system comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device;

sequentially recording a condition of a brake as time-series data from start to end of an operation, and receiving a user ID and a password in dependence upon a vehicle number input; and authenticating access to an access point, being performed by an authentication server on the ground device, wherein the wireless communication data that should be set to the device on a mobile object is generated based on prepared data generation information representing the wireless communication data predetermined in association with a mobile object identification code previously provided to the mobile object on which the device on a mobile object is installed to enable identifying the mobile object and the wireless mobile object identification code of the mobile object on which the device on a mobile object to which the communication data should be set is installed, and the generated wireless communication data is provided to the device on a mobile object as the wireless communication data that should be set to the de-vice on a mobile object.

29. A method for providing wireless communication data for a data gathering system for a mobile object, the method providing the wireless communication data to a wireless communication unit of a device on a mobile object in the data gathering system for a mobile object, the system comprising a ground device installed on the ground and a plurality of devices on a mobile object each of which is installed on a mobile object, each of the devices on a mobile object comprising information storage unit having mobile object information storing means for storing mobile object information including at least one of first mobile object information concerning a mobile object itself on which the device on a mobile object is installed and second mobile object information concerning a device mounted in the mobile object and the wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying the units being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device;

sequentially recording a condition of a brake as time-series data from start to end of an operation, and receiving a user ID and a password in dependence upon a vehicle number input; and authenticating access to an access point, being performed by an authentication server on the ground device, wherein the wireless communication data that should be set to the wireless communication unit of the device on a mobile object is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed, and the generated wireless communication data is provided to the wireless communication unit in the device on a mobile object as the wireless communication data that should be set to the wireless communication unit in the device on a mobile object.

30. A device for providing wireless communication data for a data gathering system for a mobile object, the device providing the wireless communication data to a device on a mobile object in the data gathering system for a mobile object, the system comprising a ground device installed on the ground and a plurality of devices on a mobile object each of which is installed on a mobile object and has mobile object information storing means for storing mobile object information including at least one of first mobile object information concerning the mobile object itself and second mobile object information concerning a device mounted in the mobile object, wireless communication data utilized to perform wireless communication by mutually identifying the ground device and the device on a mobile object through a wireless LAN based on a predetermined wireless communication protocol being set to the device on a mobile object, the ground device being connected to the device on a mobile object through the wireless LAN by the wireless communication using the set wireless communication data, the mobile object information stored in the mobile object information storing means being collected by the ground device, the device comprising:

wireless communication data providing means for providing to the device on a mobile object the communication data that should be set to the device on a mobile object and that is generated based on prepared data generation information representing the wireless communication data predetermined in association with a mobile object identification code previously provided to the mobile object on which the device on a mobile object is installed to enable identifying the mobile object and the wireless mobile object identification code of the mobile object on which the device on a mobile object to which the communication data should be set is installed; and an information storage unit that sequentially records a condition of a brake as time-series data from start to end of an operation, and receives a user ID and a password in dependence upon a vehicle number input, wherein the ground device comprises at least:

an authentication server that authenticates access to an access point.

31. A device for providing wireless communication data for a data gathering system for a mobile object, the device providing the wireless communication data to a wireless communication unit in the data gathering system for a mobile object, the system comprising a ground device installed on the ground and a plurality of devices on a mobile object each of which is installed on a mobile object, each of the devices on a mobile object comprising information storage unit having mobile object information storing means for storing mobile object information including at least one of first mobile object information concerning a mobile object itself on which the device on a mobile object is installed and second mobile object information concerning a device mounted in the mobile object and a wireless communication unit that is mutually connected with the information storage unit by mutually performing cable communication through a cable LAN in accordance with a predetermined cable communication protocol and that performs wireless communication with the ground device through a wireless LAN in accordance with a predetermined wireless communication protocol, wireless communication data configured to perform wireless communication between the ground device and the wireless communication unit and the information storage unit of the device on a mobile object through the wireless LAN in accordance with a predetermined communication protocol by mutually identifying the units being set to the wireless communication unit of the device on a mobile object, the ground device being connected with the device on a mobile object through the wireless LAN based on the wireless communication using the set wireless communication data, the mobile object information stored in the mobile object information storing means of the information storage unit being collected by the ground device, the device comprising:

wireless communication data providing means for providing to the wireless communication unit of the device on a mobile object the wireless communication data that should be set to the wireless communication unit of the device on a mobile object and is generated based on prepared data generation information representing the wireless communication data predetermined in association with a mobile object identification code previously provided to the mobile object on which the device on a mobile object is installed to enable identifying the mobile object and the mobile object identification code of the mobile object on which the device on a mobile object to which the wireless communication data should be set is installed; and an information storage unit that sequentially records a condition of a brake as time-series data from start to end of an operation, and receives a user ID and a password in dependence upon a vehicle number input, wherein the ground device comprises at least:

an authentication server that authenticates access to an access point.

32. A network system for organizing vehicles comprising an on-vehicle device installed in each vehicle in a vehicle unit including a plurality of vehicles each traveling on a track, communication data utilized to communicate by mutually identifying the on-vehicle devices through a vehicle unit LAN in accordance with a predetermined communication protocol being set to the on-vehicle devices, the on-vehicle devices being connected to each other through the vehicle unit LAN by communication using the set communication data, the system comprising:

communication data providing means for providing o the on-vehicle device the communication data that should be set to the on-vehicle device and is generated based on prepared data generation information representing the communication data predetermined in accordance with a vehicle identification code previously provided to the vehicle in which the on-vehicle device is installed to enable identifying the vehicle and the vehicle identification code of the vehicle in which the on-vehicle device to which the communication data should be set is installed;

a first information storage unit that sequentially stores failure history information and diagnosis results with time about at least one of the on-vehicle devices, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the at least one of the on-vehicle devices are connected with each other; and a ground device installed on the ground, wherein the ground device is connected to the at least one of the on-vehicle devices through the LAN, wherein the ground device comprises at least:

a collection server unit that collects and stores mobile object information;

an authentication server unit that authenticates access to an access point; and at least one wireless communication unit that communicates with the device on a mobile object.

33. A network system for organizing vehicles comprising an on-vehicle device installed in each vehicle in a vehicle unit including a plurality of vehicles each traveling on a track, the on-vehicle device having a plurality of terminal devices and a network control device that is mutually connected to the plurality of terminal devices by mutually performing communication through an in-vehicle LAN in accordance with a predetermined communication protocol and also communicates with the on-vehicle devices installed in the other vehicles through a vehicle unit LAN in accordance with the predetermined communication protocol, communication data configured to perform communication by mutually identifying the terminal devices installed in all the vehicles in the vehicle unit and the network control devices installed in the other vehicles through the vehicle unit LAN in accordance with the predetermined communication protocol being set to the network control device, the on vehicle devices being connected to each other through the vehicle unit LAN based on communication using the set communication data, the system comprising:

communication data providing means for providing to the plurality of terminal devices and the network control device in the on-vehicle device the communication data that is generated to be set to the plurality of terminal devices and the network control device in the on-vehicle device based on prepared data generation information representing the communication data predetermined in association with a vehicle identification code previously provided to the vehicle in which the on-vehicle device is installed to enable identifying the vehicle and the vehicle identification code of the vehicle in which the on-vehicle device to which the communication data should be set is installed;

a first information storage unit that sequentially stores failure history information and diagnosis results with time about at least one of the on-vehicle devices, and venerates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the at least one of the on-vehicle devices are connected with each other; and a ground device installed on the ground, wherein the ground device is connected to the at least one of the on-vehicle devices through the LAN, wherein the ground device comprises at least:

a collection server unit that collects and stores mobile object information;

an authentication server unit that authenticates access to an access point; and at least one wireless communication unit that communicates with the device on a mobile object.

34. The network system for organizing vehicles according to claim 32 or 33, further comprising communication data storing means for storing the communication data that should be set to the on-vehicle device or the plurality of terminal devices and the network control device in the on vehicle device and is generated based on prepared data generation information representing the communication data predetermined in association with a vehicle identification code previously provided to the vehicle in which the on vehicle device is installed to enable identifying the vehicle and the vehicle identification code of the vehicle in which the on-vehicle device to which the communication data should be set is installed, wherein the communication data providing means provides the communication data by reading out the communication data stored in the communication data storing means.

35. The network system for organizing vehicles according to claim 32 or 33, further comprising:

vehicle identification code storing means for storing a vehicle identification code previously provided to the vehicle in which the on-vehicle device is installed to enable identifying the vehicle; and communication data generating means for generating the communication data based on the vehicle identification code stored in the vehicle identification code storing means and prepared data generation information representing the communication data predetermined in association with the vehicle identification code, wherein the communication data providing means provides the communication data based on the communication data generated by the communication data generating means.

36. The network system for organizing vehicles according to any one of claim 32 or 33, wherein the data generation information is an arithmetic expression configured to calculate and generate based on the vehicle identification code the communication data for the communication predetermined in association with the vehicle identification code.

37. An on-vehicle device for a network system for organizing vehicles, the on-vehicle device being installed in each vehicle in a vehicle unit including a plurality of vehicles each traveling on a track and connected through a vehicle unit LAN to constitute the network system for organizing vehicles, communication data configured to perform communication by mutual identification through the vehicle unit LAN in accordance with a predetermined communication protocol being set, the on-vehicle device being connected through the vehicle unit LAN based on communication using the set communication data, the on vehicle device comprising:

communication data providing means for providing to itself the communication data that should he set and is generated based on prepared data generation information representing the communication data predetermined in association with a vehicle identification code previously provided to the vehicle to be installed to enable identifying the vehicle and the vehicle identification code of the installed vehicle;

a first information storage unit that sequentially stores failure history information and diagnosis results with time about the on-vehicle device, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the on-vehicle device are connected with each other; and a ground device installed on the ground, wherein the ground device is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

38. An on-vehicle device for a network system for organizing vehicles, the on-vehicle device being installed in each vehicle in a vehicle unit including a plurality of vehicles each traveling on a track and connected through a vehicle unit LAN to constitute the network system for organizing vehicles, the on-vehicle device having a plurality of terminal devices and a network control unit that is mutually connected with the plurality of terminal devices by performing mutual communication through an in vehicle LAN in accordance with a predetermined communication protocol and performs communication through the vehicle unit LAN in accordance with the predetermined communication protocol, communication data configured to perform communication between the terminal devices installed in all the vehicles in the vehicle unit and the network control units installed in the other vehicles by mutual identification through the vehicle unit LAN in accordance with the predetermined communication protocol being set to the network control unit, the on-vehicle devices being connected to each other through the vehicle unit LAN based on communication using the set communication data, the on-vehicle device comprising:

communication data providing means for providing to the plurality of terminal devices and the network control unit the communication data that is generated to be set to the plurality of terminal devices and the network control unit of itself based on prepared data generation information representing the communication data predetermined in association with a vehicle identification code previously provided to the vehicle to be installed to enable identifying the vehicle unit LAN and the vehicle identification code of the installed vehicle;

a first information storage unit that sequentially stores failure history information and diagnosis results with time about the on-vehicle device, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the on-vehicle device are connected with each other; and a ground device installed on the ground, wherein the ground device is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

39. A method for providing communication data for a network system for organizing vehicles, the method providing communication data to an on-vehicle device in the network system for organizing vehicles, the system comprising the on-vehicle device installed in each vehicle in a vehicle unit including a plurality of vehicles each traveling on a track, the communication data configured to perform communication between the on-vehicle devices by mutual identification through a vehicle unit LAN in accordance with a predetermined communication protocol being set to the on-vehicle device, the on-vehicle devices being connected to each other through the vehicle unit LAN based on communication using the set communication data, wherein the communication data that should be set is generated based on prepared data generation information representing the communication data predetermined in association with a vehicle identification code previously provided to the vehicle in which on-vehicle device is installed to enable identifying the vehicle and the vehicle identification code of the vehicle in which the on-vehicle device to which the communication data should be set is installed, and the generated communication data is provided to the on-vehicle device as the communication data that should be set;

sequentially storing failure history information and diagnosis results with time about the on-vehicle device, and generating a routine table in dependence upon a generated static I.P. address for the LAN, on a first information storage unit;

sequentially recording a condition of a brake as time-series data from start to end of an operation, and receiving a user ID and a password in dependence upon a vehicle number input on a second information storage unit, wherein the first information storage unit, the second information storage unit, and the on-vehicle device are connected with each other; and communicating between the on-vehicle device and a ground device, wherein the ground device is installed on the ground and is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

40. A method for providing communication data for a network system for organizing vehicles, the method providing communication data to a plurality of terminal devices and a network control device in the network system for organizing vehicles, the system comprising an on vehicle device installed in each vehicle in a vehicle unit including a plurality of vehicles each traveling on a track, the on-vehicle device having the plurality of terminal devices and the network control device that is mutually connected to the plurality of terminal devices by performing mutual communication through an in-vehicle LAN in accordance with a predetermined communication protocol and performs communication with the on-vehicle devices installed in the other vehicles through a vehicle unit LAN in accordance with the predetermined communication protocol, the communication data configured to perform communication between the terminal devices installed in all the vehicles in the vehicle unit and the network control devices installed in the other vehicles by performing mutual identification through the vehicle unit LAN in accordance with the predetermined communication protocol being set to the network control device, the on-vehicle devices being connected to each other through the vehicle unit LAN based on communication using the set communication data, wherein the communication data that should be set to the network control unit in the on-vehicle device is generated based on prepared data generation information representing the communication data predetermined in association with a vehicle identification code previously provided to the vehicle in which the on-vehicle device is installed to enable identifying the vehicle and the vehicle identification code of the vehicle, and the generated communication data is provided to the plurality of terminal devices and the network control device in the on-vehicle device as the communication data that should be set to the network control unit in the on vehicle device;

sequentially storing failure history information and diagnosis results with time about the on-vehicle device, and generating a routing table in dependence upon a generated static I.P. address for the LAN, on a first information storage unit;

sequentially recording a condition of a brake as time-series data from start to end of an operation, and receiving a user ID and a password in dependence upon a vehicle number input on a second information storage unit, wherein the first information storage unit, the second information storage unit, and the on-vehicle device are connected with each other; and communicating between the on-vehicle device and a ground device, wherein the ground device is installed on the ground and is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

41. A device for providing communication data for a network system for organizing vehicles, the device providing the communication data to an on-vehicle device in the network system for organizing vehicles, the system comprising the on-vehicle device installed in each vehicle in a vehicle unit including a plurality of vehicles each traveling on a track, the communication data configured to perform communication between the on-vehicle devices by performing mutual identification through a vehicle unit LAN in accordance with a predetermined communication protocol being set to the on-vehicle device, the on-vehicle devices being connected to each other through the vehicle unit LAN based on communication using the set communication data, the device comprising:

communication data providing means for providing to the on-vehicle device the communication data that should be set to the on-vehicle device and is generated based on prepared data generation information representing the communication data predetermined in association with a vehicle identification code previously provided to the vehicle in which the on-vehicle device is installed to enable identifying the vehicle and the vehicle identification code of the vehicle in which on-vehicle device to which the communication data should be set is installed;

a first information storage unit that sequentially stores failure history information and diagnosis results with time about the on-vehicle device, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the on-vehicle device are connected with each other; and a ground device installed on the ground, wherein the ground device is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

42. A device for providing communication data for a network system for organizing vehicles, the device providing communication data to a plurality of terminals and a network control device in the network system for organizing vehicles, the system comprising an on-vehicle device installed in each vehicle in a vehicle unit including a plurality of vehicles each traveling on a track, the on-vehicle device having the plurality of terminal devices and a network control device that is mutually connected to the plurality of terminal devices by performing mutual communication through an in-vehicle LAN in accordance with a predetermined communication protocol and performs communication with the on-vehicle devices installed in the other vehicles through a vehicle unit LAN in accordance with the predetermined communication protocol, the communication data configured to perform communication between the terminal devices installed in all the vehicles in the vehicle unit and the network control devices installed in the other vehicles by performing mutual identification through the vehicle unit LAN in accordance with the predetermined communication protocol, the on vehicle devices being connected to each other through the vehicle unit LAN based on communication using the set communication data, the device comprising:

communication data providing means for providing to the plurality of terminal devices and the network control device in the on-vehicle device the communication data that should be set to the plurality of terminal devices and the network control device in the on-vehicle device and is generated based on prepared data generation information representing the communication data predetermined in association with a vehicle identification code previously provided to the vehicle in which the on-vehicle device is installed to enable identifying the vehicle and the vehicle identification code of the vehicle in which the on-vehicle device to which the communication data should be set is installed;

a first information storage unit that sequentially stores failure history information and diagnosis results with time about the on-vehicle device, and generates a routing table in dependence upon a generated static I.P. address for the LAN;

a second information storage unit that sequentially records a condition of a brake as time-series data from start to end of an operation, and receives a user ID and a password in dependence upon a vehicle number input, wherein the first information storage unit, the second information storage unit, and the on-vehicle device are connected with each other; and a ground device installed on the ground, wherein the ground device is connected to the on-vehicle device through the LAN, wherein the ground device comprises at least:

a collection server unit that collects and stores mobile object information;

an authentication server unit that authenticates access to an access point; and at least one wireless communication unit that communicates with the on-vehicle device.

* * * * *